(12) United States Patent
Kagawa

(10) Patent No.: US 7,752,184 B2
(45) Date of Patent: Jul. 6, 2010

(54) INFORMATION PROCESSING APPARATUS, INFORMATION PROCESSING METHOD, AND PROGRAM

(75) Inventor: Yoshiaki Kagawa, Tokyo (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 11/458,567

(22) Filed: Jul. 19, 2006

(65) Prior Publication Data

US 2007/0027855 A1    Feb. 1, 2007

(30) Foreign Application Priority Data

Jul. 27, 2005    (JP) .............................. P2005-216793

(51) Int. Cl.
*G06F 17/30* (2006.01)

(52) U.S. Cl. .............................. 707/702; 707/999.003; 707/999.107; 715/700; 382/130

(58) Field of Classification Search .................. 382/130
See application file for complete search history.

(56) References Cited

U.S. PATENT DOCUMENTS

| | | | | |
|---|---|---|---|---|
| 5,652,881 | A * | 7/1997 | Takahashi et al. | 707/104.1 |
| 6,915,003 | B2 * | 7/2005 | Oosawa | 382/130 |
| 7,028,050 | B1 * | 4/2006 | Rose | 707/104.1 |
| 7,197,165 | B2 * | 3/2007 | Ryan | 382/103 |
| 7,373,021 | B2 * | 5/2008 | Wada | 382/305 |
| 2001/0048757 | A1 * | 12/2001 | Oosawa | 382/130 |
| 2002/0168117 | A1 * | 11/2002 | Lee et al. | 382/305 |
| 2002/0196292 | A1 * | 12/2002 | Itoh et al. | 345/853 |
| 2003/0140033 | A1 * | 7/2003 | Iizuka et al. | 707/1 |
| 2004/0090460 | A1 * | 5/2004 | Kawahara | 345/764 |
| 2004/0098389 | A1 * | 5/2004 | Jones et al. | 707/6 |
| 2004/0103093 | A1 * | 5/2004 | Furuhashi et al. | 707/3 |
| 2006/0200759 | A1 * | 9/2006 | Agrawala et al. | 715/517 |
| 2008/0222170 | A1 * | 9/2008 | Farnham et al. | 707/100 |

FOREIGN PATENT DOCUMENTS

JP    2005-115529    4/2005

OTHER PUBLICATIONS

Where are your Graphics today? The Hitchhiker's Guide to ThumbsPlus, Cerious Software, Inc. Nov. 18, 2004.*

ThumbsPlus version 7 beta 7, Beta Release Notes, Build 2097, Jun. 2004.*

(Continued)

*Primary Examiner*—James Trujillo
*Assistant Examiner*—Albert Phillips
(74) *Attorney, Agent, or Firm*—K&L Gates LLP

(57) ABSTRACT

An information processing apparatus which, when a user searches through a plurality of contents for a desired content, causes a display device to display a plurality of indexes corresponding to the plurality of contents is provided. The apparatus includes: a content selection device that selects one of the plurality of contents; an approximation degree calculation device that calculates degrees of approximation between the selected content on the one hand and each of the other contents on the other hand; and a layout determination device that determines a layout of the index of the selected content and determines layouts of the indexes of the other contents relative to the index of the selected content in accordance with the degrees of approximation. The index of the selected content and the indexes of the other contents are displayed on the display device as laid out by the layout determination device.

14 Claims, 17 Drawing Sheets

OTHER PUBLICATIONS

Sugiyama, Graph Drawing by Magnetic Spring Model, Journal of Visual Languages and Computing, p. 217-231, 1995.*

Zhang, Information Retrieval by Semantic Analysis and Visualization, D-Lib Magazine, vol. 8, No. 10, Oct. 2002, pp. 1-17.*

Zhou, Force Directed Place Algorithm, Jan. 14, 2004, pp. 1-5.*

Viji, Term and Document Correlation Visualization for a set of Documents, 2003, pp. 1-9.*

Mukherjea, S. et al., "Visualizing the Results of Multimedia Web Search Engines," Information Visualization '96, pp. 64-65, 122 (1996).

Rodrigues, J.F. et al., "Using Efficient Visual Exploration Techniques to Evaluate Features for Content-Based Image Retrieval," Computer Graphics and Image Processing, pp. 183-190, (2003).

Suvanaphen, E. et al., "Explicit Verses Implicit: An Analysis of a Multiple Search Result Visualization," Information Visualization, pp. 731-736 (2004).

Spoerri, A. "How Visual Query Tools Can Support Users Searching the Internet," Information Visualization, pp. 329-334 (2004).

* cited by examiner

INFORMATION PROCESSING APPARATUS, INFORMATION PROCESSING METHOD, AND PROGRAM

CROSS REFERENCES TO RELATED APPLICATIONS

The present application claims priority to Japanese Patent Application JP 2005-216793 filed with the Japanese Patent Office on Jul. 27, 2005, the entire contents of which is being incorporated herein by reference.

BACKGROUND

The present invention generally relates to an information processing apparatus, an information processing method, and a program. More particularly, the present invention relates to an information processing apparatus, an information processing method, and a program for searching for and retrieving desired contents with ease.

In recent years, the prices of large-capacity hard disk drives and semiconductor memories have plummeted. The trend has allowed a growing number of people to store large quantities of contents (e.g., moving and still pictures) on their storage media. Currently under study are a number of techniques for searching through information processing apparatus as a massive content holder for desired contents. One such technique is disclosed illustratively in Japanese Patent Laid-open No. 2005-115529.

One typical technique for searching for (i.e., selecting) a desired content from among massive contents involves grouping the contents into a layered structure. The layers are then selected one after another so that the contents belonging to each selected layer may be displayed until the desired content is found. Another technique involves displaying a user-recognizable number of contents on a screen in order of their dates or names. The display is repeated with contents on different screens until the desired content is found. What is displayed on the screen may not be contents themselves but may be thumbnails, icons, titles or other indications representing the contents.

Such prevalent content searching techniques have been suitable for consecutively searching through retained contents. The trouble is that it takes more and more time and effort to search through the increasing number of contents. Because parts of massive contents are locally displayed for search purposes, it is difficult to get an overview of the contents in storage.

With little consideration for relationships between stored contents, it is also difficult to recognize contents that are similar to one another. According to another technique, a plurality of keywords are input and the contents matching the entered keywords are retrieved for display so that contents similar to what is desired may be found. However, some users find it tiresome to carry out such input operations.

The trend for storage media to become still larger in capacity is expected to intensify. The challenge is how to search easily through masses of stored contents for the desired content.

Additional features and advantages are described herein, and will be apparent from, the following Detailed Description and the figures.

SUMMARY

According to an embodiment thereof, there is provided an information processing apparatus which, when a user searches through a plurality of contents for a desired content, causes a display device to display a plurality of indexes corresponding to the plurality of contents, the information processing apparatus including: content selection means for selecting one of the plurality of contents; approximation degree calculation means for calculating degrees of approximation between the selected content on the one hand and each of the other contents on the other hand; and layout determination means for determining a layout of the index of the selected content and for determining layouts of the indexes of the other contents relative to the index of the selected content in accordance with the degrees of approximation. The index of the selected content and the indexes of the other contents are displayed on the display device in a manner laid out by the layout determination means.

If the contents are pictures, then the indexes may be thumbnails of the pictures in an embodiment.

The approximation degree calculation means may calculate the degrees of approximation based on feature quantities of the contents in an embodiment.

The layout determination means may determine the layouts of the other contents in such a manner that distances between the index of the selected content and the indexes of the other contents will be inversely proportional to the degrees of approximation in an embodiment.

The layout determination means may determine the layouts the indexes of the other contents relative to the index of the selected content in accordance with a model of springs having spring constants defined by the degrees of approximation in an embodiment.

The layout determination means may determine the layouts in either a two-dimensional space or a three-dimensional space in an embodiment.

The information processing apparatus may further include addition means for adding auxiliary indications representing the degrees of approximation to the indexes of the other contents in an embodiment.

According to another embodiment of the present invention, there is provided an information processing method which, when a user searches through a plurality of contents for a desired content, causes a display device to display a plurality of indexes corresponding to the plurality of contents. The information processing method includes the steps of: selecting one of the plurality of contents; calculating degrees of approximation between the selected content on the one hand and each of the other contents on the other hand; and determining a layout of the index of the selected content and determining layouts of the indexes of the other contents relative to the index of the selected content in accordance with the degrees of approximation. The index of the selected content and the indexes of the other contents are displayed on the display device in a manner laid out in the determining step.

According to a further embodiment of the present invention, there is provided a program for causing a computer to execute a procedure which, when a user searches through a plurality of contents for a desired content, causes a display device to display a plurality of indexes corresponding to the plurality of contents. The procedure includes the steps of: selecting one of the plurality of contents; calculating degrees of approximation between the selected content on the one hand and each of the other contents on the other hand; and determining a layout of the index of the selected content and determining layouts of the indexes of the other contents relative to the index of the selected content in accordance with the degrees of approximation. The index of the selected content and the indexes of the other contents are displayed on the display device in a manner laid out in the determining step.

According to the present invention in an embodiment, as outlined above, a plurality of contents are displayed when a user searches through the plurality of contents for a desired content. One of the plurality of contents is selected, and degrees of approximation are calculated between the selected content on the one hand and each of the other contents on the other hand. A layout of an index of the selected content is determined, and so are layouts of indexes of the other contents relative to the index of the selected content in accordance with the degrees of approximation. The index of the selected content and the indexes of the other contents are displayed on a display device in keeping with the determined layouts.

The information processing apparatus, information processing method, and program according to an embodiment of the present invention are thus capable of allowing the user to search for desired contents in an appreciably easier manner than before.

Additional features and advantages are described herein, and will be apparent from, the following Detailed Description and the figures.

DETAILED DESCRIPTION

An information processing apparatus is provided (e.g., information processing apparatus 11 in FIG. 1) which, when a user searches through a plurality of contents for a desired content, causes a display device to display a plurality of indexes corresponding to the plurality of contents. The information processing apparatus includes: content selection means (e.g., content selection device 31 in FIG. 1) for selecting one of the plurality of contents; approximation degree calculation means (e.g., approximation degree calculation device 22 in FIG. 1) for calculating degrees of approximation between the selected content on the one hand and each of the other contents on the other hand; and layout determination means (e.g., thumbnail layout device 23 in FIG. 1) for determining a layout of the index of the selected content and for determining layouts of the indexes of the other contents relative to the index of the selected content in accordance with the degrees of approximation. The index of the selected content and the indexes of the other contents are displayed on the display device in a manner laid out by the layout determination means.

An information processing method or a program for causing a computer to execute a procedure is provided which, when a user searches through a plurality of contents for a desired content, causes a display device to display a plurality of indexes corresponding to the plurality of contents. The procedure includes the steps of: selecting (e.g., in step S11 of FIG. 12) one of the plurality of contents; calculating (e.g., in step S12 of FIG. 12) degrees of approximation between the selected content on the one hand and each of the other contents on the other hand; and determining (e.g., in step S13 of FIG. 12) a layout of the index of the selected content and determining layouts of the indexes of the other contents relative to the index of the selected content in accordance with the degrees of approximation. The index of the selected content and the indexes of the other contents are displayed on the display device in a manner laid out in the determining step.

Figure 1:
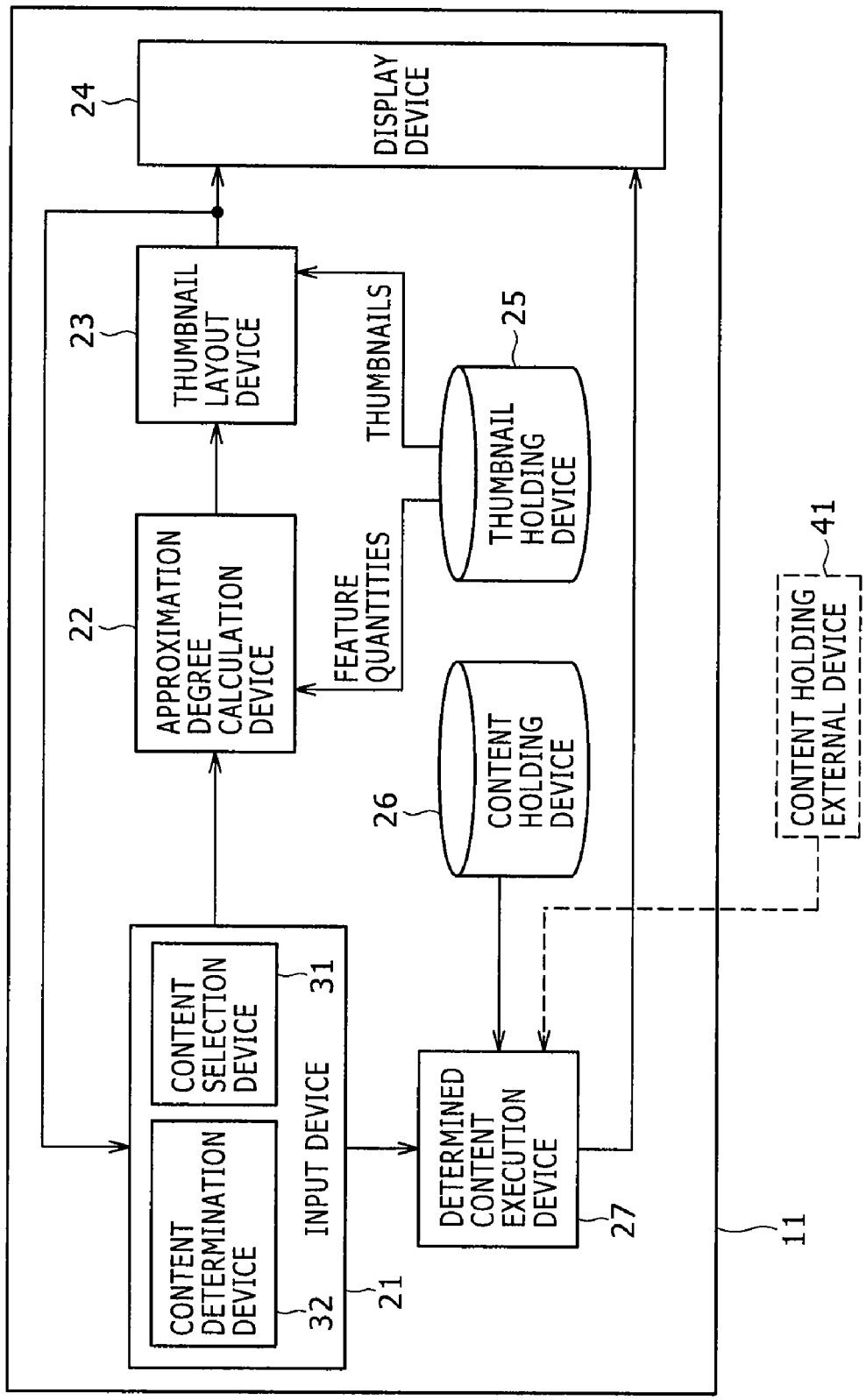
FIG. 1 is a block diagram showing a typical structure of an information processing apparatus embodying the present invention.

FIG. 1 shows a typical structure of an information processing apparatus 11 embodying the present invention.

In FIG. 1, the information processing apparatus 11 is made up of an input device 21, an approximation degree calculation device 22, a thumbnail layout device 23, a display device 24, a thumbnail holding device 25, a content holding device 26, and a determined content execution device 27. The input device 21 includes a content selection device 31 and a content determination device 32.

The information processing apparatus 11 causes the display device 24 to display on its screen indexes corresponding to the contents held in the content holding device 26. A user performs operations to select and decide on a desired one of the indexes being displayed. With a particular index thus determined, the information processing apparatus 11 executes the content corresponding to the selected index.

Illustratively, the contents may be moving pictures, still pictures, broadcast programs (on given channels), or pieces of music (songs). The indexes are titles that permit instant recognition of the corresponding contents. For example, if a given content is a moving picture or a still picture, the index may be a image (representative image) of the moving picture or a thumbnail of the still picture; if the content is a broadcast program on a channel, the index may be a logo of the channel in question; if the content is a song, the index may be a jacket image representative of the song in question. The indexes need not be pictures; they may be letters (i.e., title) explanatory of the corresponding contents. In the ensuing examples, it is assumed that the contents are moving pictures (including sounds) and that their indexes are thumbnails of the representative images from the moving pictures.

The input device 21 is operated by the user, and supplies the configured devices of the apparatus with information reflecting the user's operation. More specifically, the user may perform operations to select a desired one of a plurality of thumbnails displayed on the display device 24. The multiple thumbnails displayed on the display device 24 represent contents held by the content holding device 26. In response to the user's operations, the content selection device 31 selects the content corresponding to the user-selected thumbnail and supplies the approximation degree calculation device 22 with information representing the selected content. That is, when the user selects one of the multiple thumbnails displayed on the display device 24, that means the user has selected a desired one of the plurality of contents held by the content holding device 26.

In the description that follows, that one of the multiple thumbnails which is selected on the display device 24 by the user will be called the selected thumbnail, and the content corresponding to the selected thumbnail will be called the selected content. Furthermore, the thumbnails other than the selected one will be called candidate thumbnails because any one of the latter may be selected next, and the contents corresponding to the candidate thumbnails will be called candidate thumbnails. It follows that if the content holding device 26 holds as many as "n" contents, then the display device 24 displays one selected thumbnail and (n-1) candidate thumbnails.

If the user determines the content corresponding to the currently selected thumbnail as the content to be executed, the user performs an operation to determine the selected thumbnail. At this point, the content determination device 32 determines the selected content corresponding to the currently selected thumbnail as the content desired to be executed by the user. The content determination device 32 then supplies the determined content execution device 27 with information representing the determined content.

In order to recognize the user-selected thumbnail, the content selection device 31 or content determination device 32 may refer as needed to display control information constituting a thumbnail layout picture (to be discussed later) supplied from the thumbnail layout device 23.

The approximation degree calculation device 22 receives content feature quantities from the thumbnail holding device 25. Based on the content feature quantities thus supplied, the approximation degree calculation device 22 calculates the degrees of approximation between the content selected by the content selection device 31 on the one hand, and each of the multiple (i.e., (n-1)) candidate contents on the other hand.

It is assumed that the content holding device 26 holds "n" contents $A(k)$ ($k=1, 2, \ldots, n$) represented by $\{A(1), A(2), \ldots, A(n)\}$ and that the contents $A(k)$ have "m" feature quantities $PA(k, s)$ ($s=1, \ldots, m$). On that assumption, as an index representative of the degree of approximation between a selected content $A(p)$ ($p=$one of $1, 2, \ldots, n$) and a candidate content $A(q)$ ($p \neq q$) in the content holding device 26, the approximation device calculation device 22 may illustratively adopt a Euclidean distance between the vector of the selected content $A(p)$ and the vector of the candidate content $A(q)$ in an m-dimensional space with its axes represented by the content feature quantities $PA(k, s)$.

That is, the degree of approximation $DA(p, q)$ between the selected content $A(p)$ and the candidate content $A(q)$ may be defined as $$DA(p, q) = SQRT\{(PA(p, 1) - PA(q, 1))2 + \quad (1)$$
$$(PA(p, m) - PA(q, m))2 + \ldots +$$
$$(PA(p, m) - PA(q, m))2\}$$

where, SQRT denotes a square root. The feature quantity $PA(k, s)$ of the content $A(k)$ may illustratively represent the tempo of music, mean value of content colors, or a created date and time included in the content $A(k)$.

The degree of approximation is calculated as described above between the selected content and each of the (n-1) candidate contents. The thumbnail layout device 23 is supplied with the degrees of approximation for the (n-1) candidate contents with regard to the selected content.

The index representing the degree of approximation between the selected content $A(p)$ and the candidate content $A(q)$ is not limited to the Euclidean distance mentioned above. Alternatively, a scalar product between the vector of the selected content $A(p)$ and the vector of the candidate content $A(q)$ may be adopted as the index representative of the degree of approximation.

The thumbnail layout device 23 determines a layout of the selected thumbnail as well as layouts of the candidate thumbnails relative to the selected thumbnail on the basis of the degrees of approximation supplied from the approximation degree calculation device 22. Using the thumbnails (i.e., their data) acquired from the thumbnail holding device 25, the thumbnail layout device 23 creates display control information constituting a picture in which the selected thumbnail and candidate thumbnails are laid out as determined (the picture is called the thumbnail layout picture). The display control information thus created is sent to the input device 21 and display device 24.

The thumbnail layout device 23 determines the layouts of the candidate thumbnails in such a manner that distances between the selected thumbnail and each of the candidate thumbnails will be inversely proportional to the degrees of approximation. In other words, the greater the degree of approximation for the thumbnail of a given candidate content (i.e., for a candidate thumbnail), the closer the candidate thumbnail to the selected thumbnail when laid out on the screen.

The display device 24 displays on its screen the thumbnail layout picture created by the display control information supplied from the thumbnail layout device 23. The display device 24 further displays a picture given when the determined content is executed in accordance with display control information sent from the determined content execution device 27. For example, the display device 24 displays a moving picture based on the display control information coming from the determined content execution device 27.

The thumbnail holding device 25 holds a thumbnail (i.e., its data) and "m" feature quantities $PA(k, s)$ regarding each of a plurality of contents. The content holding device 26 holds as many as "n" contents $\{A(1), A(2), \ldots, A(n)\}$ (i.e., their data). It is possible to store the contents, their thumbnails and their feature quantities $PA(k, s)$ in the same location.

On the basis of the determined content information supplied from the content determination device 32, the determined content execution device 27 acquires the determined content (i.e., its data) from the content holding device 26 and executes the determined content. Illustratively, the determined content execution device 27 may reproduce a moving picture and cause the display device 24 to display the reproduced picture. As needed, the determined content execution device 27 may carry out diverse processes including decompression of the picture data and conversion of the data into a suitable picture signal such as the one compatible with the NTSC (National Television System Committee) standard.

It might happen that the determined content designated by the determined content information is retained in a content holding external device 41 outside the information processing apparatus 11. In such a case, the determined content execution device 27 gains access to the content holding external device 41 through a communication device, not shown, and acquires the determined content from the accessed device 41. In this setup, the content holding device 26 may hold addresses or like indications pointing to the locations where the determined content can be accessed (e.g., Web server address, device ID of storage equipment, etc.).

In the information processing apparatus 11 structured as described above, the degrees of approximation are calculated between the selected content and each of the candidate contents with regard to the thumbnail selected by the user. Reflecting the calculated degrees of approximation, the candidate thumbnails are laid out relative to the selected thumbnail in the thumbnail layout picture displayed on the display device 24. The user may change the selected thumbnails as needed until the desired content is found.

Figure 2:
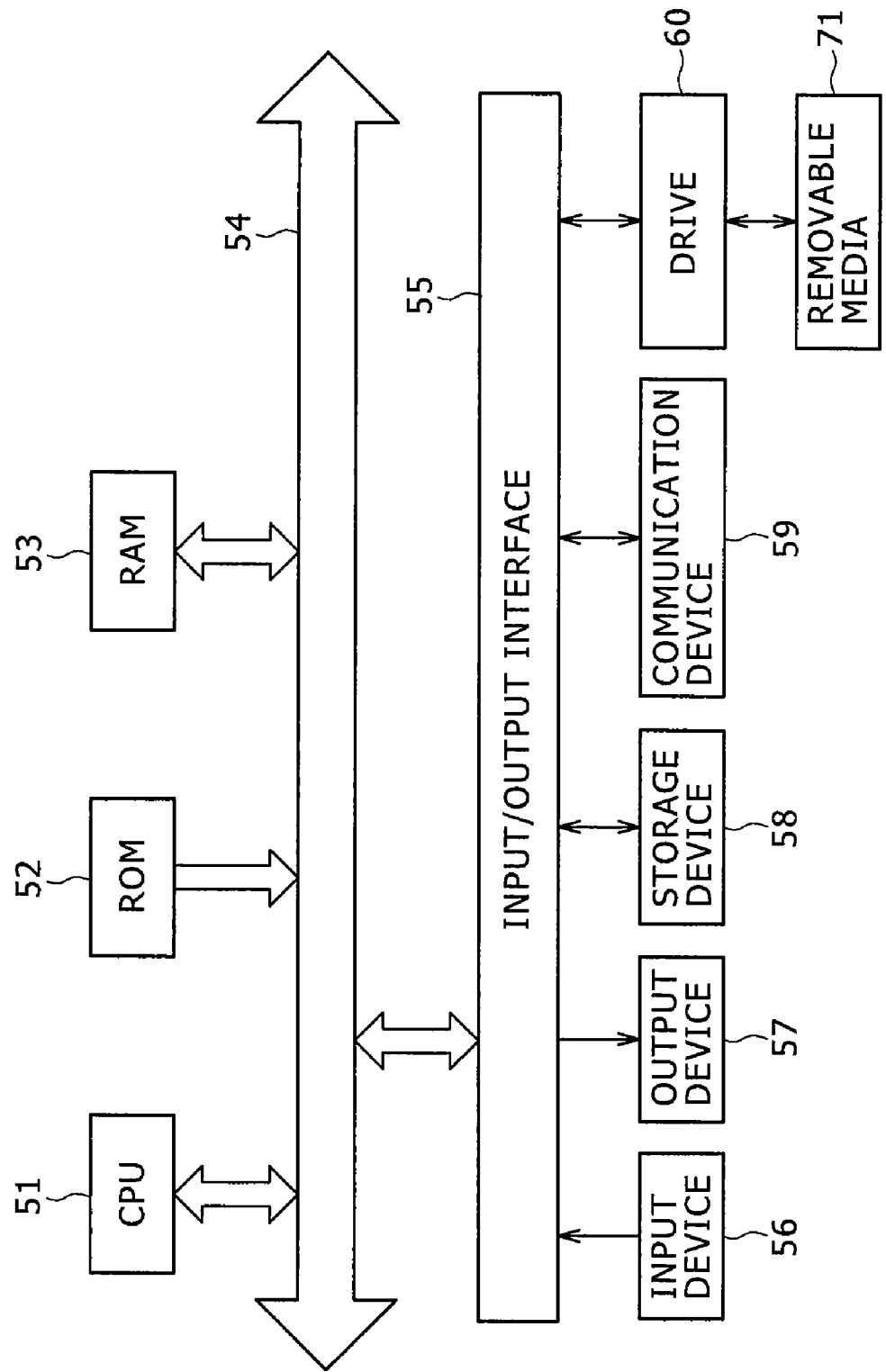
FIG. 2 is a block diagram showing a typical structure of hardware for implementing the information processing apparatus in FIG. 1.

FIG. 2 is a block diagram showing a typical structure of hardware for implementing the information processing apparatus 11 shown in FIG. 1. A CPU (central processing unit) 51 performs various processes in keeping with programs stored in a ROM (read only memory) 52 or a storage device 58. A RAM (random access memory) 53 accommodates as needed the programs and data being executed or operated on by the CPU 51. The CPU 51, ROM 52, and RAM 53 are interconnected by a bus 54.

The CPU 51 may illustratively be "Cell," described in "Cell Is Born," on pp. 89-117 of the Feb. 28, 2005 issue (in Japanese) of Nikkei Electronics published by Nikkei Business Publications, Inc.

An input/output interface 55 is also connected to the CPU 51 via the bus 54. The input/output interface 55 is connected with an input device 56 and an output device 57. The input device 56 is typically constituted by a keyboard, a mouse, microphones, and a remote controller. The output device 57 is composed illustratively of a display unit such as CRT (cathode ray tube) or LCD (liquid crystal display) and speakers. The CPU 51 carries out diverse processes in response to commands entered through the input device 56. The CPU 51 outputs the result of the processing to the output device 57.

The storage device 58 connected to the input/output interface 55 is typically formed by a hard disk drive that stores programs and data to be executed and operated on by the CPU 51. A communication device 59 communicates with an externally connected device either directly or indirectly by way of a network such as the Internet or a local area network.

The communication device 59 may conduct communications in wireless or wired fashion, or both. The communication system that may be adopted by the communication device 59 is not limited to any specific scheme. For wireless communication, the system may be a wireless LAN (local area network) based on the IEEE (The Institute of Electrical and Electronic Engineers) 802.11a, 802.11b, or 802.11g standard, Bluetooth, or any other suitable standard; for wired communication, the system may be one pursuant to IEEE 1394, the Ethernet (registered trademark), USB (Universal Serial Bus), or any other suitable criteria.

A drive 60 connected to the input/output interface 55 may be loaded with removable media 71 such as a magnetic disk, an optical disk, a magneto-optical disk or a semiconductor memory. The drive 60 drives the loaded piece of removable media 71 and acquires programs and data that may be recorded thereon. The acquired programs and data may be transferred as needed to the storage device 58 for storage. Alternatively, the programs and data may be acquired through the communication device 59 before they are stored into the storage unit 58.

What follows is a description of how the thumbnail layout device 23 typically determines layouts of candidate thumbnails in accordance with the degrees of approximation supplied from the approximation degree calculation device 22.

For purpose of simplification and illustration in the ensuing description, it is assumed that the content holding device 26 holds six contents {A(1), A(2), A(3), A(4), A(5), A(6)}={A, B, C, D, E, F} and that the content selection device 31 has selected the content A (i.e., its thumbnail) as instructed by the user. In other words, the content A is assumed to be the selected content, with the contents B, C, D, E and F regarded as candidate contents.

The degrees of approximation between the selected content A and each of the candidate contents B, C, D, E and F are calculated by use of the foregoing expression (1). The calculations are performed as follows:

$$DA(A,B)=DA(1,2)=DA'$$

$$DA(A,C)=DA(1,3)=(4/10)DA'$$

$$DA(A,D)=DA(1,4)=(8/10)DA'$$

$$DA(A,E)=DA(1,5)=(6/10)DA'$$

$$DA(A,F)=DA(1,6)=(2/10)DA' \qquad (2)$$

That is, the highest degree of approximation DA(A, B)(=DA') is found between the selected content A and the candidate content B. The second-highest degree of approximation DA(A, D)(=8/10 times DA') is detected between the selected content A and the candidate content D, followed by the degree of approximation DA(A, E)(=6/10 times DA') between the selected content A and the candidate content E, the degree of approximation DA(A, C)(=4/10 times DA') between the selected content A and the candidate content C, and the degree of approximation DA(A, F)(=2/10 times DA') between the selected content A and the candidate content F, in that order (i.e., DA(A, B)>DA(A, D)>DA(A, E)>DA(A, C)>DA(A, F)).

Figure 3:
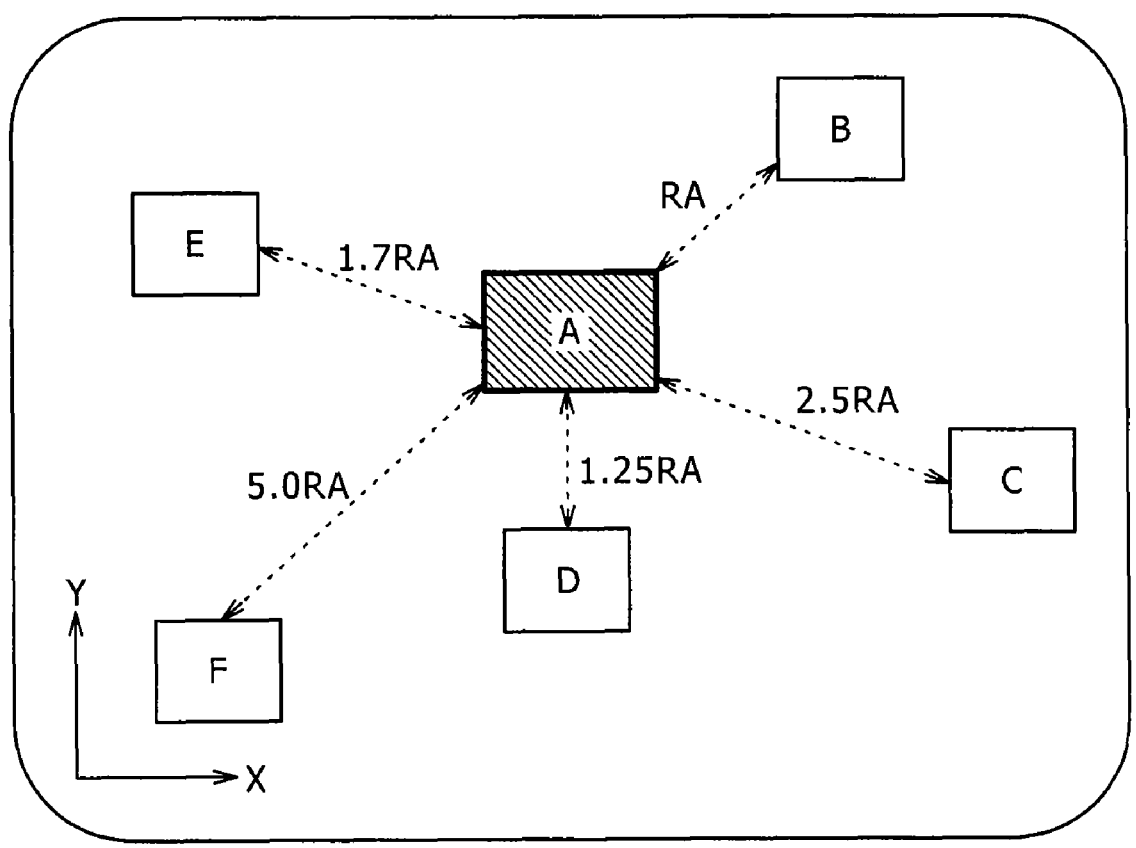
FIG. 3 is a schematic view explanatory of how thumbnail layouts are determined.

Initially, as shown in FIG. 3, the thumbnail layout device 23 positions the selected thumbnail A at the center of a picture (i.e., screen) in which a two-dimensional coordinate system (an X-Y coordinate system) is established. The thumbnail layout device 23 then positions the thumbnail of the candidate content B (i.e., candidate thumbnail B) having the highest degree of approximation to the selected content A at a distance RA from the selected thumbnail A in keeping with the degree of approximation DA(A, B).

The thumbnail layout device 23 proceeds to position the thumbnail of the candidate content D (i.e., candidate thumbnail D) having the second-highest degree of approximation to the selected content A at a distance from the selected thumbnail A in accordance with the degree of approximation DA(A, D), the candidate thumbnail D being laid out so as to avoid overlapping with the candidate thumbnail B. As mentioned above, the candidate thumbnails B through F are each positioned relative to the selected thumbnail A in a manner inversely proportional to the corresponding degrees of approximation. Illustratively, the distance between the selected thumbnail A and the candidate thumbnail D is 1.25 (=10/8) times the distance RA between the selected thumbnail A and the candidate thumbnail B (i.e., the distance is 1.25 RA).

Similarly, the thumbnail layout device 23 positions the candidate thumbnails E, C and F, in that order, at distances from the selected thumbnail A in accordance with the respective degrees of approximation to the thumbnail A and in a manner avoiding overlaps with the already positioned candidate thumbnails. The distances from the selected thumbnail A to the candidate thumbnails E, C and F are thus 1.7 RA, 2.5 RA, and 5.0 RA respectively, as shown in FIG. 3.

In principle, the candidate thumbnail to be positioned next need only be laid out in a manner avoiding overlaps with the already laid-out candidate thumbnails. In another example, the candidate thumbnails that fall within the same category may be laid out in a manner converging on the same radial direction starting from the selected thumbnail A (i.e., in the direction at a fixed angle). In this case, the distribution of the categories that subsume the candidate contents held by the content holding device 26 may be recognized more easily than before.

As the number of contents grows, it becomes increasingly difficult to position candidate thumbnails in a manner avoiding overlaps with the already laid-out candidate thumbnails. In such cases, the candidate thumbnails may be positioned selectively where the density of thumbnails laid out per unit area is low.

The layouts of the thumbnails A through F in FIG. 3 may be considered to be in a equilibrized state (steady state) where the selected thumbnail A is connected to each of the candidate thumbnails B through F with springs having spring constants reflecting the degrees of approximation to the candidate A.

Figure 4:
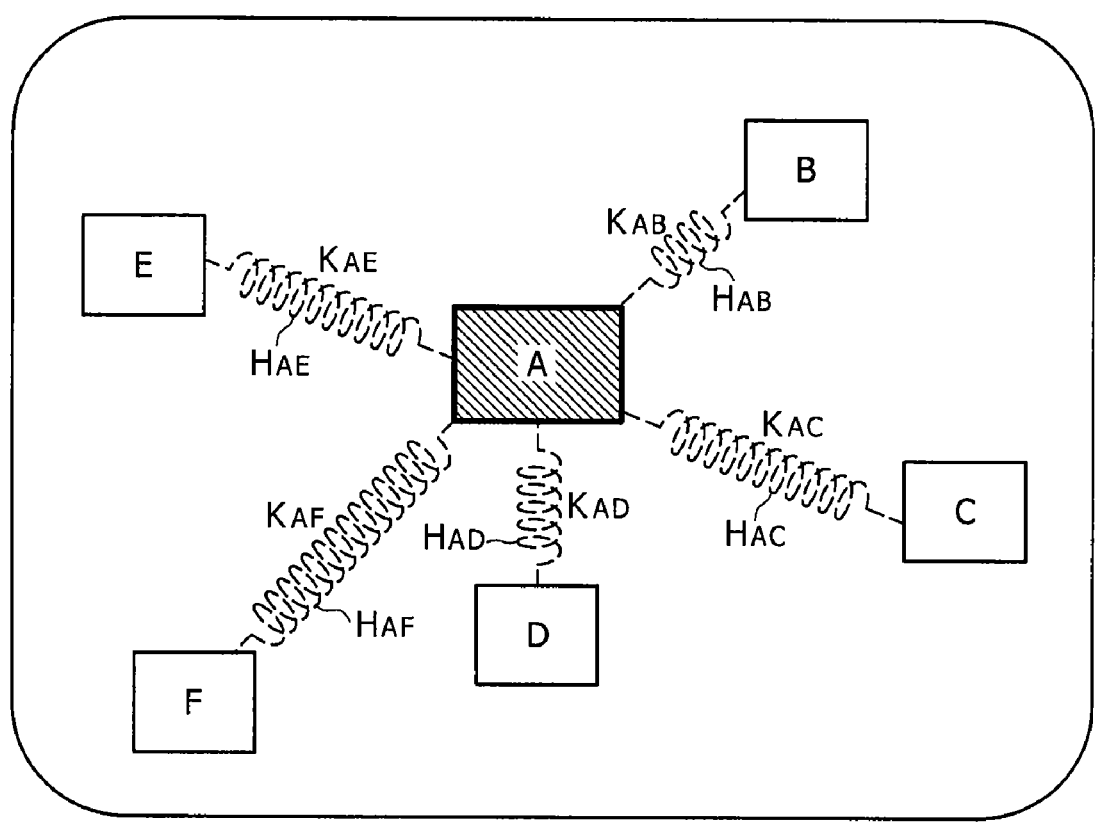
FIG. 4 is another schematic view explanatory of how thumbnail layouts are determined.

FIG. 4 is a conceptual view explanatory of a model of springs having spring constants defined by the degrees of approximation of the candidate thumbnails B through F relative to the selected thumbnail A.

In FIG. 4, the selected thumbnail A is connected to the candidate thumbnail B with a spring HAB having a spring constant kAB; the selected thumbnail A is connected to the candidate thumbnail C with a spring HAC having a spring constant kAC; the selected thumbnail A is connected to the candidate thumbnail D with a spring HAD having a spring constant kAD; the selected thumbnail A is connected to the candidate thumbnail E with a spring HAE having a spring constant kAE; the selected thumbnail A is connected to the candidate thumbnail F with a spring HAF having a spring constant kAF.

It is assumed here that the springs HAB, HAC, HAD, HAE, and HAF have the same natural length (i.e., length of the spring at no load); and that the spring constants kAB, kAC, kAD, kAE, and kAF are proportional to the degrees of approximation DA(A, B), DA(A, D), DA(A, E), DA(A, C) and DA(A, F), respectively (i.e., the higher the degree of approximation, the larger the spring constant). The ratios of the spring constants kAB through kAF of the springs HAD through HAF, relative to the spring constant kAB of the spring HAB taken as the reference (=1), are assumed to be kAB: kAD: kAE: kAC: kAF=1: (8/10): (6/10): (4/10): (2/10).

Figure 5:
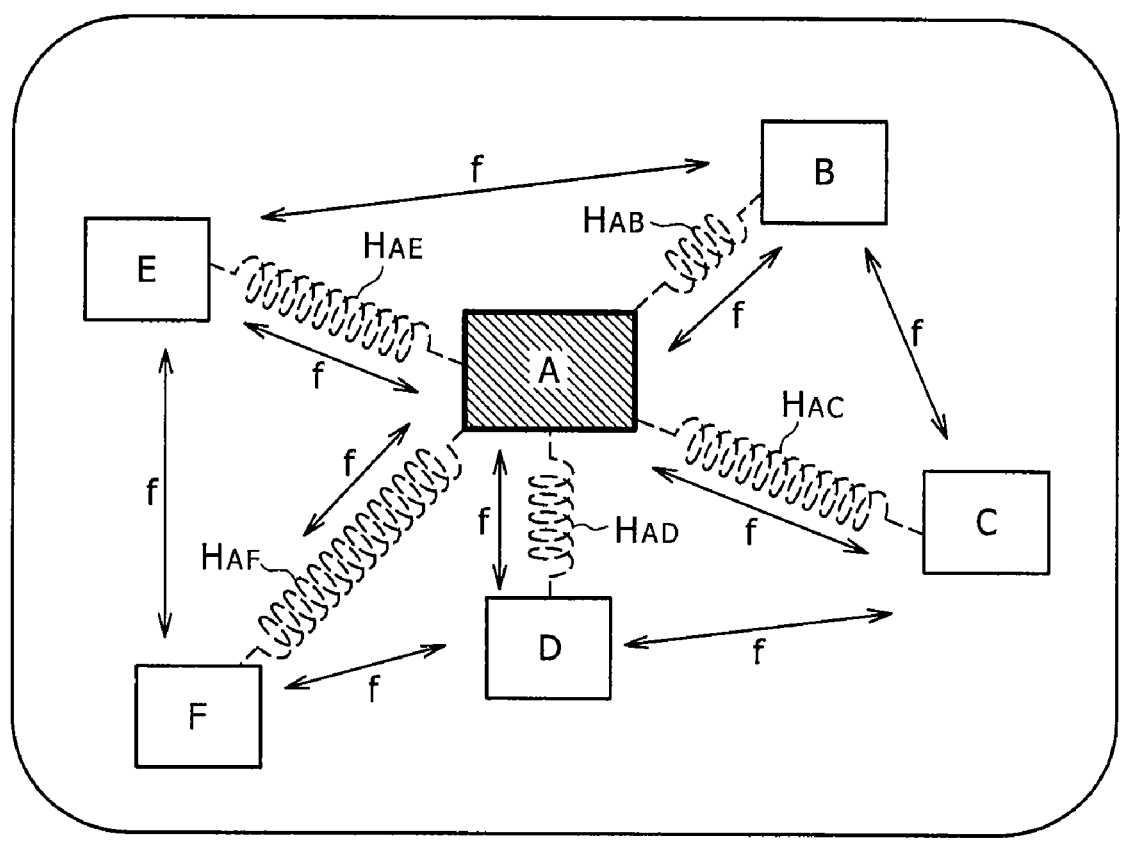
FIG. 5 is another schematic view explanatory of how thumbnail layouts are determined.

As shown in FIG. 5, it may be assume that the selected thumbnail A and each of the candidate thumbnails B through F repel one another with a force "f" while being attracted at the same time by the springs HAB through HAF in a state of equilibrium. Since the spring constants kAB through kAF of the springs HAB through HAF are proportional to degrees of approximation, the higher the degree of approximation of a given thumbnail, the closer that thumbnail is to the selected thumbnail A as it remains still for the moment. Of the candidate thumbnails B through F, the one with the highest degree of approximation to the selected thumbnail A is at the shortest distance (i.e., attracted) from the latter; the candidate thumbnail with the lowest degree of approximation to the selected thumbnail A is at the longest distance from the latter. Because the repelling force "f" may also be assumed to exist between the adjacent (i.e., nearby) candidate thumbnails, the candidate thumbnails B through F may be laid out in a manner avoiding overlaps with one another.

Figure 6:
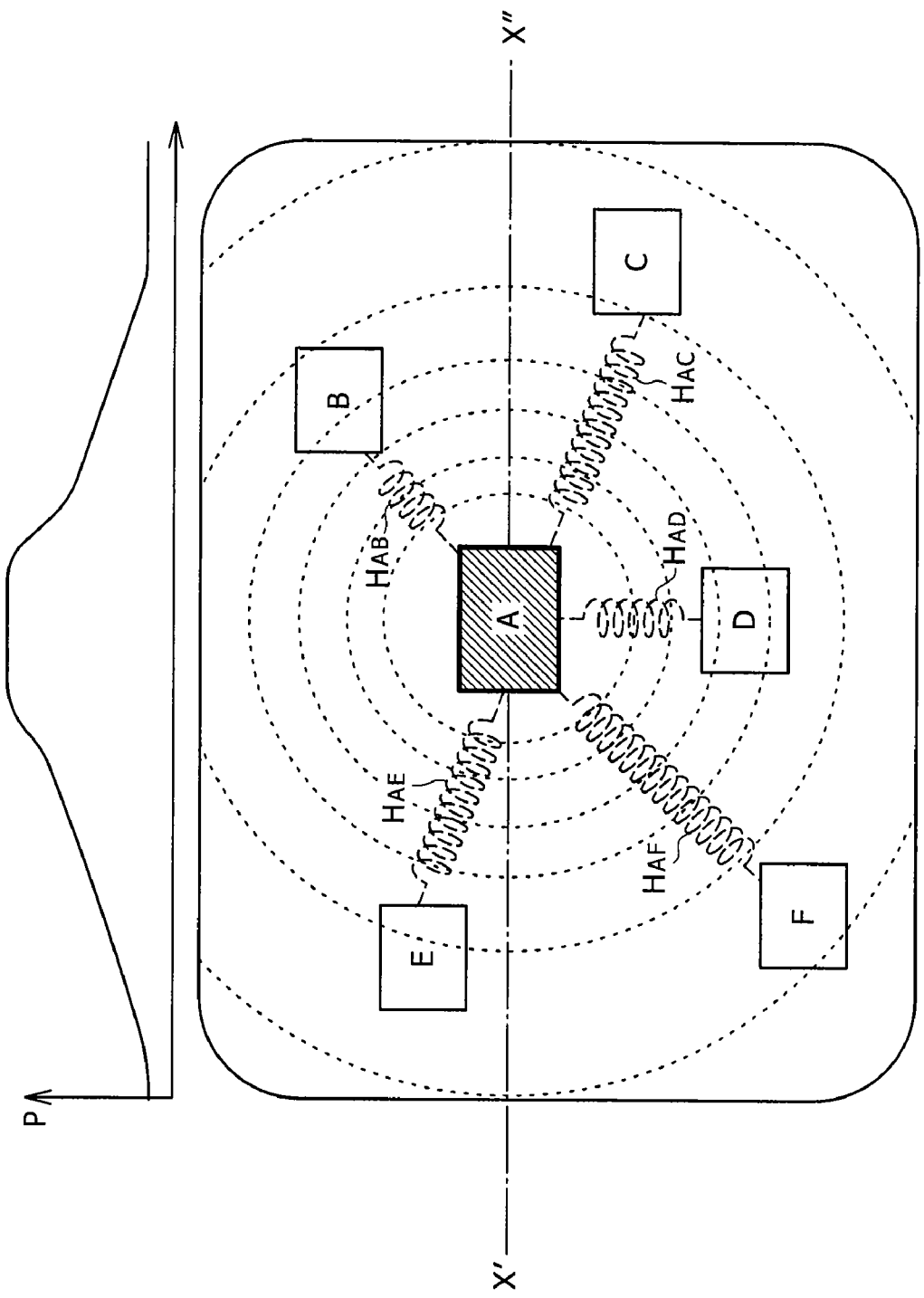
FIG. 6 is another schematic view explanatory of how thumbnail layouts are determined.

The spring model above may be interpreted otherwise as follows: a field of force may be assumed to exist in a two-dimensional space on the screen as shown in FIG. 6. With this field in effect, the force (called the potential hereunder) is assumed to be the largest at the center of the screen where the selected thumbnail A is positioned; the further away from the center, the lower the potential. A graphic representation in the upper part of FIG. 6 shows illustratively a potential P occurring along a line x'-x" in the X-axis direction passing the center of the screen.

In the above setup, the candidate thumbnails B through F connected to the selected thumbnail A with the springs HAB through HAF remain still where the potential P is equal to the force generated by each of the springs HAB through HAF (i.e., in positions away from the selected thumbnail A). Because the spring constants kAB through kAF of the springs HAB through HAF are proportional to degrees of approximation, the higher the degree of approximation of any one of the springs HAB through HAF relative to the selected candidate A, the greater the potential generated by that spring and the closer the spring, motionless, to the selected thumbnail A. The thumbnail layout device 23 adjusts layout directions of the candidate thumbnails B through F with respect to the selected thumbnail A so that the candidate thumbnails B through F will not overlap with one another.

As described above, when the thumbnail A is selected from among the thumbnails A through F representing the contents A through F held by the content holding device 26, the thumbnail layout device 23 positions the selected thumbnail A at the center of the screen, calculates the degrees of approximation of the candidate thumbnails B through F relative to the selected thumbnail A, and lays out the candidate thumbnails B through F in such a manner that they are kept in a state of equilibrium by the springs with their spring constants defined by the degrees of approximation.

On a thumbnail layout screen where the candidate thumbnails B through F are laid out around the selected thumbnail A in accordance with their degrees of approximation, the user may drag or otherwise move the selected thumbnail A in the two-dimensional space. How the selected thumbnail A and the candidate thumbnails B through F are relocated in such a case will be discussed below with reference to FIGS. 7 through 11. In each of FIGS. 7 through 11, the spring model shown in FIG. 5 is assumed to apply (as in FIG. 6).

Figure 7:
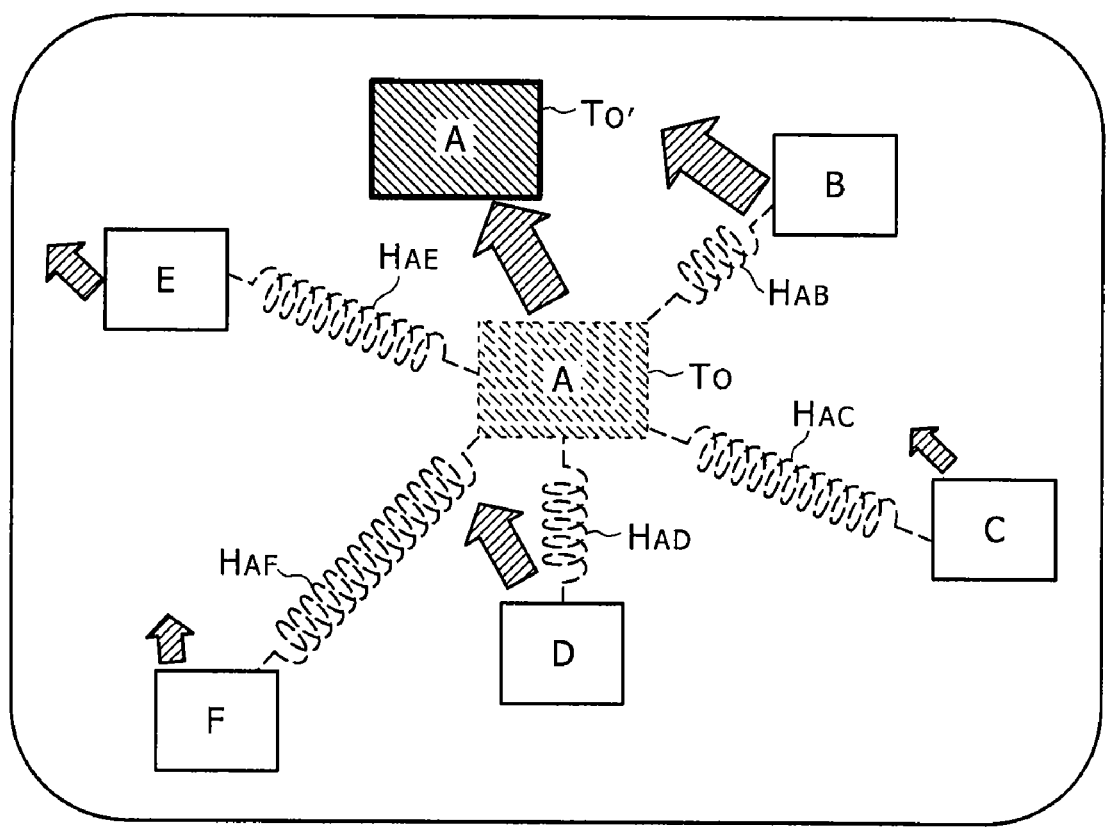
FIG. 7 is another schematic view explanatory of how thumbnail layouts are determined.

Illustratively, suppose that the user moves the selected thumbnail A from a position TO at the center of the screen to an upper left position T0' as shown in FIG. 7. Initially, the selected thumbnail A is assumed to be connected to the candidate thumbnails B through F with the springs HAB through HAF having the spring constants kAB through kAF reflecting the degrees of approximation to the selected thumbnail A. On that assumption, a candidate thumbnail connected to the selected thumbnail A with the spring having a higher spring constant is moved more quickly than the other candidates in conjunction with the selected candidate A; a candidate thumbnail connected to the selected thumbnail A with the spring having a lower spring constant is moved more slowly than the other candidates in keeping with the selected candidate A.

Arrows shown in FIG. 7 represent the speeds (i.e., acceleration) at which the candidate thumbnails B through F start getting moved relative to the speed (acceleration) of the selected thumbnail A. The longer (or thicker) the arrow, the higher the speed of the corresponding candidate thumbnail relative to the selected thumbnail A being moved (i.e., the acceleration of the candidate thumbnail is close to that of the selected thumbnail A).

Figure 8:
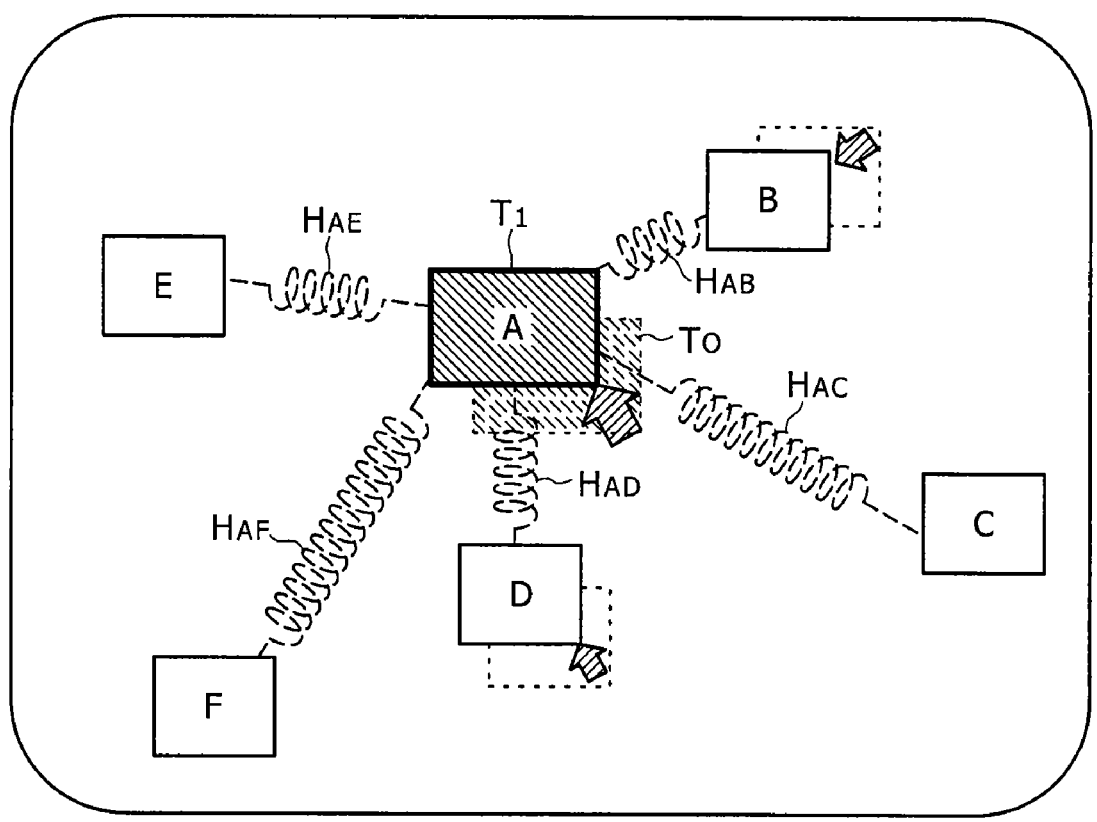
FIG. 8 is another schematic view explanatory of how thumbnail layouts are determined.

Suppose that as depicted in FIG. 8, the selected thumbnail A is now moved by the user's operation from the position T0 to a position T1. At this point, the only candidate thumbnails that have started moving are the candidate thumbnail B connected to the selected thumbnail A with the spring HAB having the spring constant kAB and the candidate thumbnail D connected to the selected thumbnail A with the spring HAD having the spring constant kAD.

Figure 9:
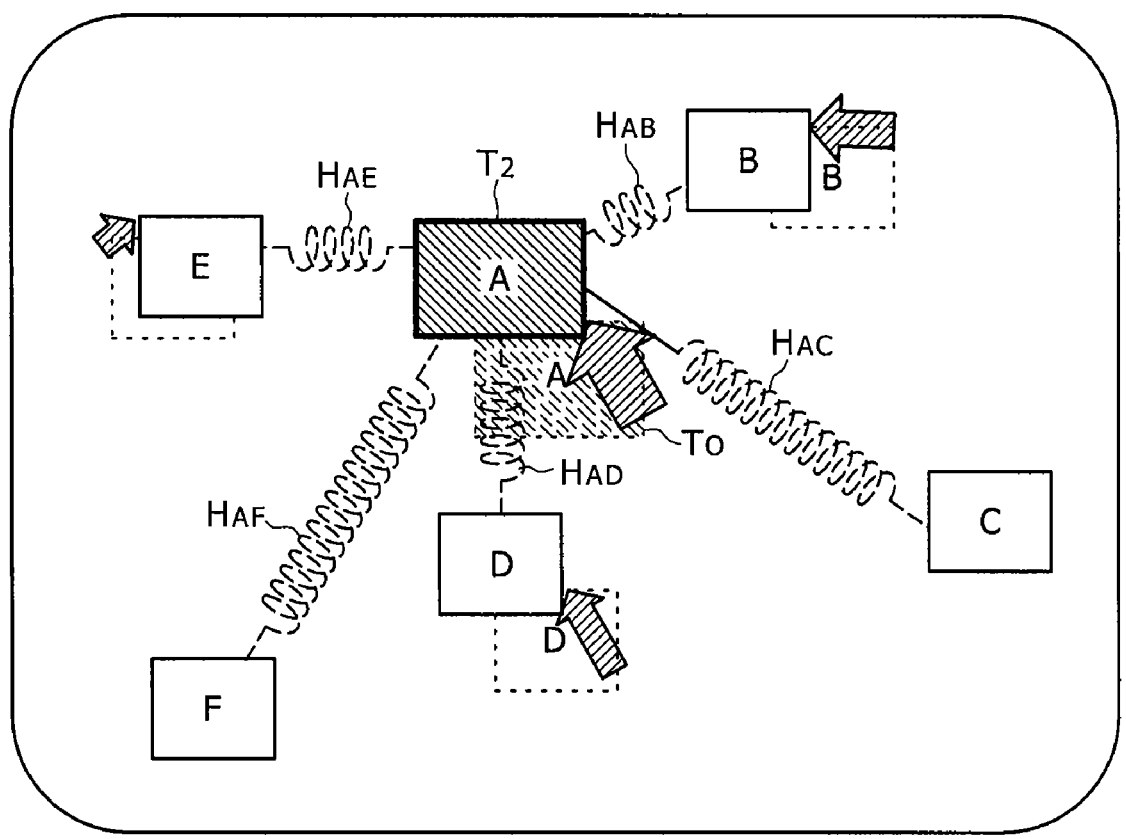
FIG. 9 is another schematic view explanatory of how thumbnail layouts are determined.
Figure 10:
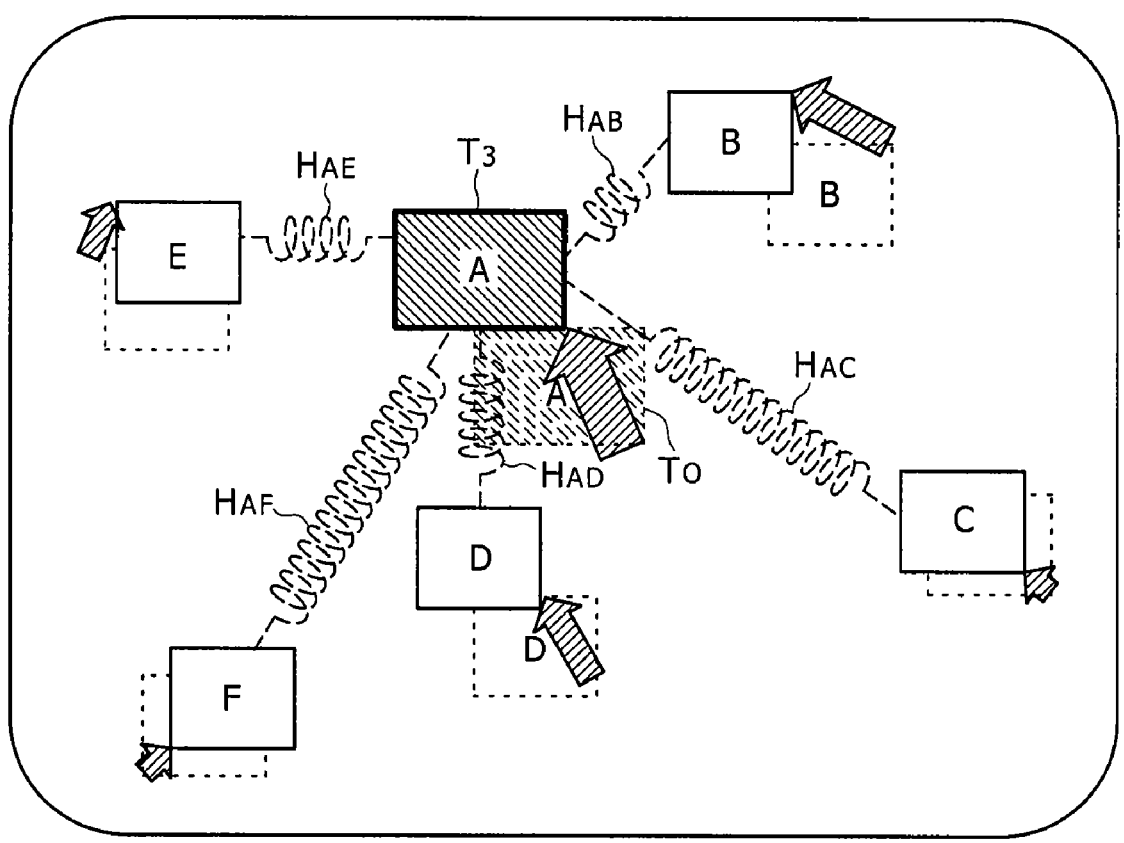
FIG. 10 is another schematic view explanatory of how thumbnail layouts are determined.

Later, when the selected thumbnail A is moved from the position T0 to a position T2 (further than the position T1 from the position T0) as shown in FIG. 9, the candidate thumbnails B and D have moved further away from their positions shown in FIG. 8. At the same time, the candidate thumbnail E connected to the selected thumbnail A with the spring HAE having the spring constant kAE starts getting moved.

Upon elapse of a certain time period from the point in time of FIG. 9, the selected thumbnail A is moved from the position T0 to a position T3 (still further than the position T2 from the position T0). At this point, the candidate thumbnails B, D and E have moved still further than their positions in FIG. 9. At the same time, the candidate thumbnail C connected to the selected thumbnail A with the spring HAC having the spring constant kAC and the candidate thumbnail F connected to the selected thumbnail A with the spring HAF having the spring constant kAF starts getting moved.

Figure 11:
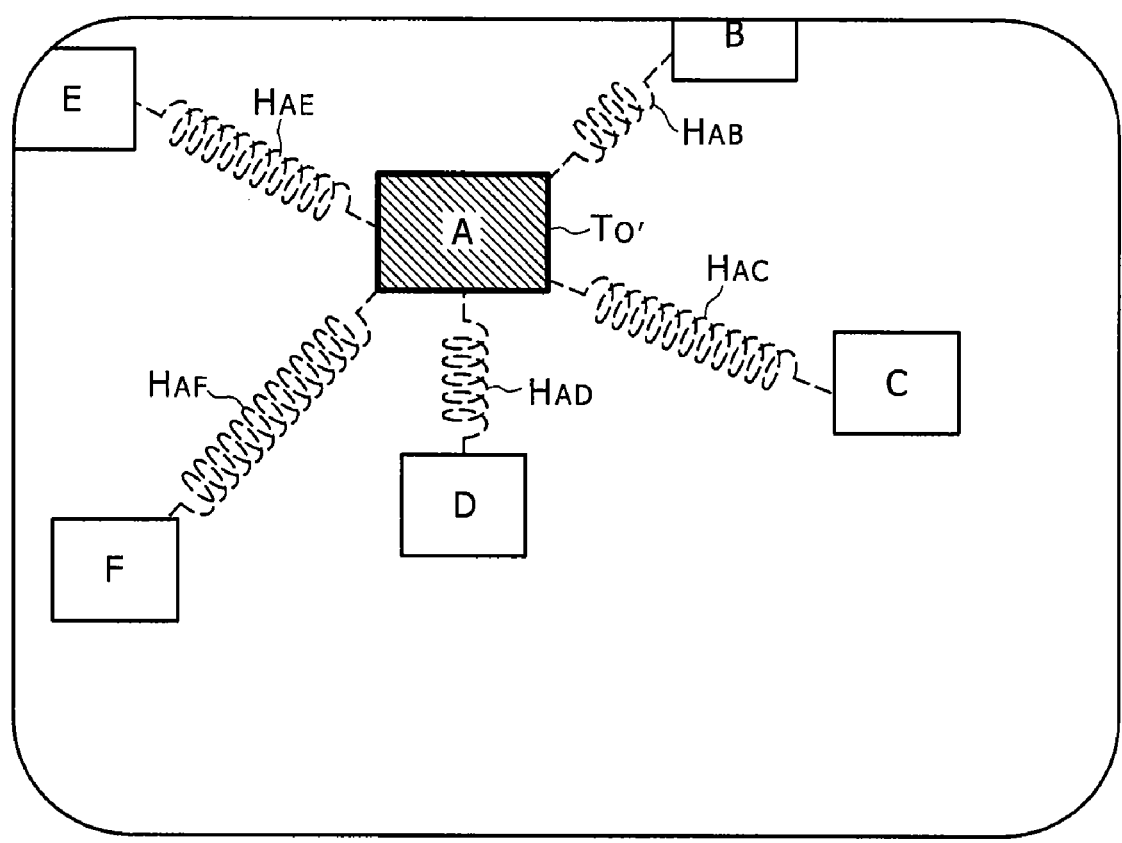
FIG. 11 is another schematic view explanatory of how thumbnail layouts are determined.

Finally, when the selected thumbnail A is moved to a position T0', the candidate thumbnails B through F vibrate more or less with the springs HAB through HAF before settling on the positions (of a steady state) where the force "f" in the two-dimensional space on the screen is in equilibrium with the springs HAB through HAF. As shown in FIG. 11, the candidate thumbnails B through F come to a stop around the position T0' of the selected thumbnail A in a layout similar to what is shown in FIG. 4. After being moved, the candidate thumbnails B through F need not be positioned relative to the position T0' of the selected thumbnail A in the same layout as before the movement. The candidate thumbnails B through F need only be positioned from the selected thumbnail A at distances proportional to their degrees of approximation.

As described above, when thumbnails are displayed according to the spring model, a candidate thumbnail with a higher degree of approximation (i.e., more similar) to the selected thumbnail A is positioned closer to the thumbnail A; a candidate thumbnail with a lower degree of approximation to the selected thumbnail A is positioned further away from the latter. When the selected thumbnail A is dragged or otherwise moved over the screen (i.e., in the two-dimensional space), candidate thumbnails with higher degrees of approximation to the thumbnail A are moved more quickly in conjunction with the thumbnail A. After the movement of the selected thumbnail A, the candidate thumbnails are again laid out relative to the relocated selected thumbnail A at distances reflecting their degrees of approximation.

The user will intuitively notice movements of the candidate thumbnails as they gather around the user-selected thumbnail. The closer the candidate thumbnails to the selected thumbnail, the better they are recognized by the user.

In other words, the inventive scheme renders more recognizable the contents whose features are similar to those of the content selected by the user with interest. In so doing, the scheme allows the user to (intuitively) search for desired contents more easily than before.

When the user selects one of the candidate thumbnails as the newly selected thumbnail by referencing the thumbnail layout picture, the degrees of approximation are calculated between the selected content corresponding to the newly selected thumbnail on the one hand, and each of a plurality of candidate contents on the other hand. The candidate thumbnails are then relocated in accordance with their degrees of approximation relative to the newly selected content.

Even if the number of thumbnails displayed on the screen is so large that the user cannot immediately find a desired thumbnail (i.e., content), the user is able to pick one similar content (i.e., similar thumbnail) after another until the content of interest is reached. In that sense, the user interface (U/I) implemented here is like taking up the rope tied to the target content.

Whenever the user selects a new thumbnail, the information processing apparatus 11 again calculates the degrees of approximation of the candidate contents relative to the selected content and redisplays their thumbnails accordingly. There is no need for the user to operate keys in order to rearrange or isolate the similar contents. This contributes to alleviating the operational burdens on the user in searching through the similar contents for what is desired.

Because the thumbnails of the candidate contents similar to the selected content are gathered around the selected thumbnail, the screen area to be checked by the user is limited to the surroundings of the selected thumbnail. This helps ease the users' eye strain.

The user need not operate keys to search for a particular content; the user need only select any of the candidate thumbnails of interest (i.e., representing contents considered close to the desired content). With the simplified operating procedure lessening the user's fatigue, the time required to retrieve the target content can be reduced significantly.

In the foregoing example, the content holding device 26 was shown holding six contents. Generally, however, the content holding device 26 holds many more contents than these. That means numerous candidate thumbnails are displayed with little clearance in between in the two-dimensional space. In such a candidate thumbnail layout state, the contents of interest to the user are better highlighted when the selected thumbnail is moved two-dimensionally.

That is, when the user moves the selected thumbnail in the two-dimensional space, only the candidate thumbnails of interest to the user are displaced at a rate of acceleration close to that of the selected thumbnail being moved. The movements of the candidate thumbnails in conjunction with the selected thumbnail being relocated allow the user to isolate (i.e., determine) a candidate content of particular interest. It might happen that there are so many candidate thumbnails that some of them are hidden behind the other despite their high degrees of approximation relative to the selected thumbnail. In that case, relocating the selected thumbnail alters the layouts of the surrounding candidate thumbnails (thanks to the forces of the springs) so that the hitherto-hidden candidate thumbnails can be revealed.

In the two-dimensional space appear the thumbnails representative of all contents held by the content holding device 26. The comprehensive thumbnail display reduces the possibility that necessary contents might be overlooked. The user can visually observe how all contents to be checked for retrieval are distributed, i.e., get an overall visual image of the contents as a whole. Because simply selecting thumbnails translates into understanding how all contents to be retrieved are distributed, it becomes appreciably easier for the user to select and determine contents.

Figure 12:
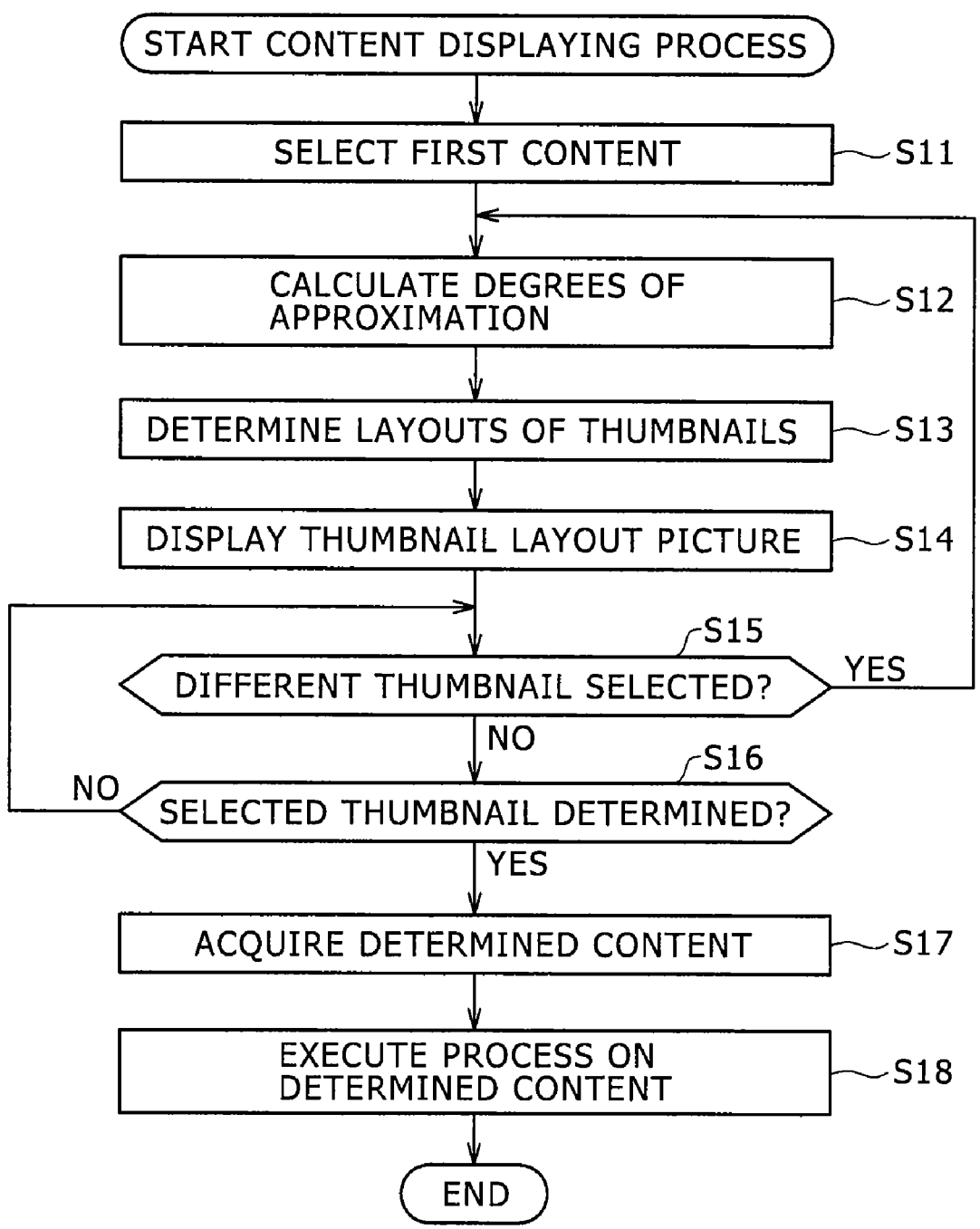
FIG. 12 is a flowchart of steps constituting a content displaying process.

FIG. 12 is a flowchart of steps constituting a content displaying process. In carrying out the process, the information processing apparatus 11 causes the display device 24 to display a thumbnail layout picture where the selected thumbnail and candidate thumbnails are laid out as described above. The display device 24 is further caused to display the content determined by the user.

An instruction is first given to display on the display device 24 the contents held by the content holding device 26. In step S11, the content selection device 31 selects a first content and supplies selected content information to the approximation degree calculation device 22 before control is passed on to step S12. Illustratively in step S11, the content applicable to a predetermined condition is selected. More specifically, what is selected may be the most recently selected content, the content being broadcast on the currently established channel, or the content having the most recent storage time.

In step S12, the approximation degree calculation device 22 calculates degrees of approximation between the selected content designated by the selected content information on the one hand, and each of a plurality of candidate contents on the other hand. Control is then passed on to step S13.

In step S13, the thumbnail layout device 23 determines layouts of the candidate thumbnails relative to the selected thumbnail in accordance with their degrees of approximation to the latter. Step S13 is followed by step S14. The selected thumbnail is positioned at the center of the screen as described above.

In step S14, using the thumbnails (i.e., their data) acquired from the thumbnail holding device 25, the thumbnail layout device 23 generates display control information constituting a thumbnail layout picture in which the selected thumbnail and candidate thumbnails are laid out as determined in step S13. The display control information thus generated is sent to the display device 25. Given the display control information from the thumbnail layout device 23, the display device 24 displays the thumbnail layout picture accordingly.

In step S15, the content selection device 31 checks to determine whether or not a thumbnail different from the currently selected thumbnail is selected, i.e., whether or not any one of the candidate thumbnails is selected. If in step S15 one of the candidate thumbnails is found to be selected, then the candidate content corresponding to the selected candidate thumbnail is regarded as the newly selected content, and control is returned to step S12. Steps S12 through S15 are then repeated. The newly chosen candidate thumbnail is now considered the selected thumbnail. Degrees of approximation are again calculated between the selected content and each of the multiple candidate contents. A thumbnail layout picture reflecting the calculated degrees of approximation is then redisplayed on the screen of the display device 24.

If in step S15 no thumbnail other than the currently selected thumbnail is found selected, then step S16 is reached. In step S16, the content determination device 32 checks to determine whether or not the currently selected thumbnail is determined by the user, i.e., whether or not the selected thumbnail is finalized. If in step S16 the selected thumbnail is not found to be determined, step S15 is reached again.

If in step S16 the selected thumbnail is found to be finalized, step S17 is reached. In step S17, the content determination device 32 supplies determined content information representative of the determined content to the determined content execution device 27. Also in step S17, the determined content execution device 27 acquires the determined content (i.e., its data) from the content holding device 26 on the basis of the determined content information supplied from the content determination device 32. Control is then passed on to step S18.

In step S18, the determined content execution device 27 performs a predetermined process on the determined content. Illustratively in step S18, the determined content execution device 27 reproduces a moving picture and supplies the display device 24 with display control information resulting from the reproducing process. Given the display control information, the display device 24 displays the moving picture accordingly, before terminating the whole process.

In the above-described example of the thumbnail layout picture, the thumbnails appearing on the screen are assumed to have the same size each. Alternatively, the thumbnails may be varied in size depending on their distances to the selected thumbnail (i.e., degree of approximation). More specifically, the further away from the selected thumbnail A, the smaller the candidate thumbnail in size.

Figure 13:
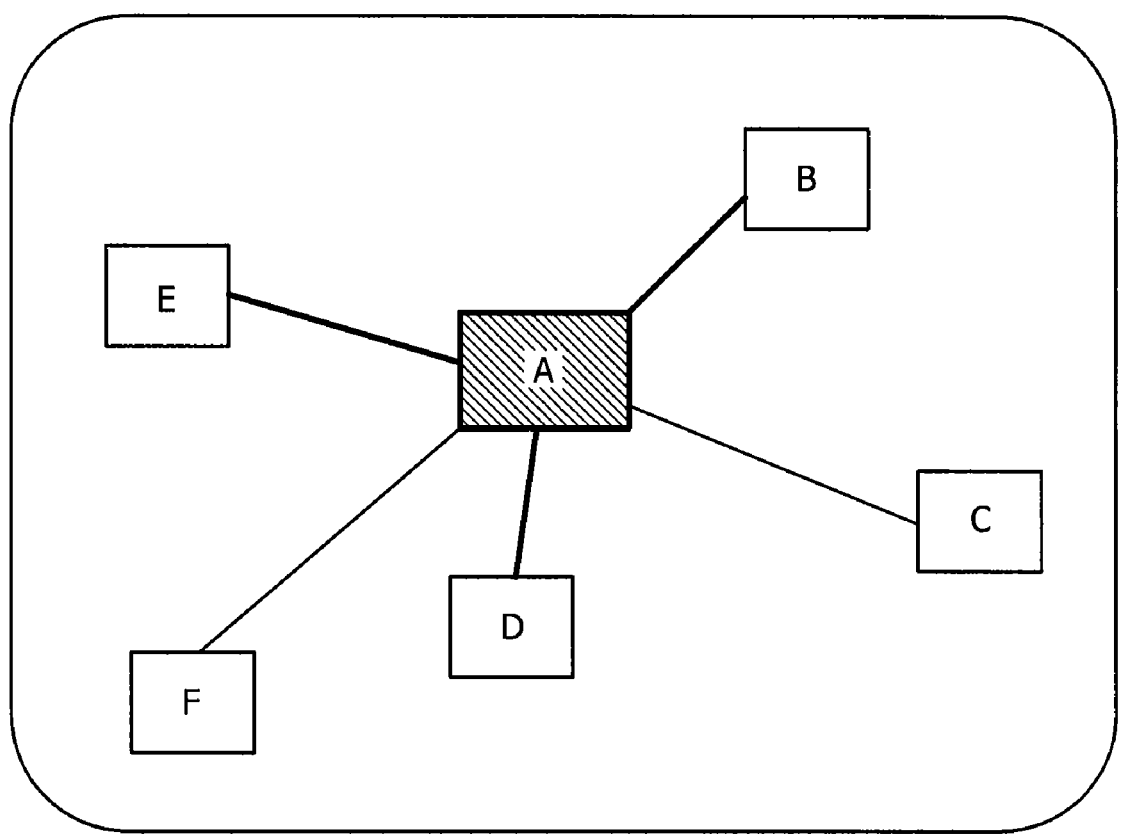
FIG. 13 is a schematic view showing a typical screen on which thumbnails are laid out in a two-dimensional space.

In another example, as shown in FIG. 13, a line may be drawn between the selected thumbnail and each candidate thumbnail, and the thickness and darkness of the line may be varied depending on the degree of approximation between the two thumbnails. It is also possible to display above or near each candidate thumbnail a numeric value indicating the degree of approximation (i.e., in value) of the corresponding content relative to the selected content, or an ordinal number showing where the content in question is ranked among the candidate contents in terms of degrees of approximation.

As described, the display of each candidate thumbnail may be varied in size or supplemented with an auxiliary indication denoting the degree of approximation of the corresponding content relative to the selected content. Such an arrangement contributes to better highlighting different degrees of approximation between candidate contents.

Explained above was how the thumbnails representing the contents held by the content holding device 26 are typically displayed in the two-dimensional space. In another example, thumbnails may be laid out in a three-dimensional space.

Figure 14:
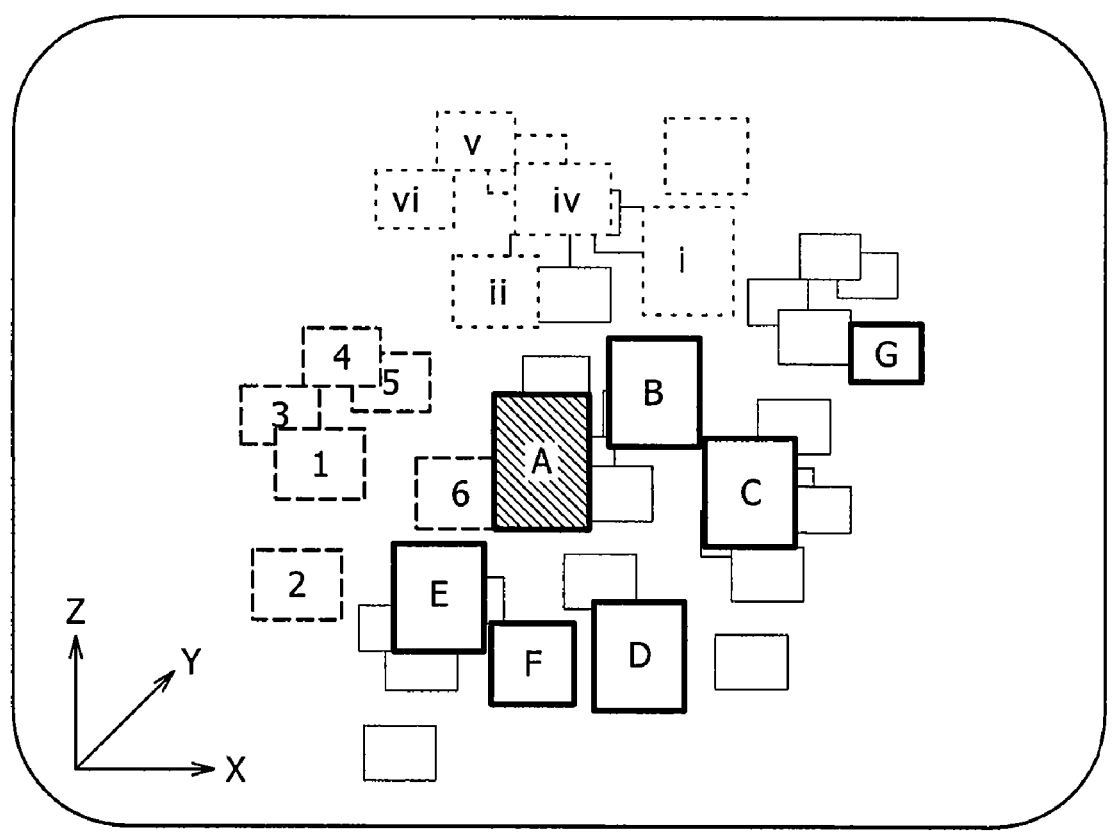
FIG. 14 is a schematic view showing a typical screen on which thumbnails are laid out in a three-dimensional space.

FIG. 14 is a schematic view showing a typical screen on which thumbnails are laid out in a three-dimensional space. Shown in FIG. 14 is a display screen (i.e., a thumbnail layout picture) constituting a three-dimensional space demarcated by the X axis in the horizontal direction, by the Z axis in the vertical direction, and by the Y axis in the depth direction. The screen displays thumbnails corresponding to the contents held by the content holding device 26.

At the center of the screen is a thumbnail A shown in the shallowest position (in the Y direction), i.e., closest to the user who is watching the screen. Displayed nearest to the selected thumbnail A are candidate thumbnails B, C and D representing candidate contents B, C and D having high degrees of approximation relative to the selected content A. Accordingly, the candidate thumbnails B, C and D appear almost as large as the selected thumbnail A. By contrast, candidate thumbnails such as a thumbnail G representing candidate contents with low degrees of approximation relative to the selected content A are displayed away from the selected thumbnail A (in deeper positions). Accordingly, these candidate thumbnails appear much smaller than the selected thumbnail A.

In FIG. 14, the candidate thumbnails are positioned (i.e., distributed) in different areas, each area representing a different category. In this manner, the user can intuitively recognize which category (i.e., group) each candidate content belongs to. In the example of FIG. 14, different types of lines making up the rectangular thumbnails denote different categories. Illustratively, the solid line-enclosed thumbnails "A," "B," "C," etc., belong to a first category; thick broken line-enclosed thumbnails "1," "2," "3," etc., belong to a second category; and thin broken line-enclosed thumbnails "i," "ii," "iii," etc., belong to a third category. Displaying such a thumbnail layout picture allows the user to get an overall image of the contents being held by the content holding device 26, as well as an understanding of the relationships between the candidate contents (i.e., candidate thumbnails).

Instead of changing the types of lines to indicate different categories as described above, it is possible to paint the thumbnail frames in different colors by category or to adopt other methods for differentiating the categories involved. In place of the category-based distribution display, it is also possible to position in each different display area those candidate thumbnails that represent the candidate contents sharing the same tendency in terms of feature quantities.

Figure 15:
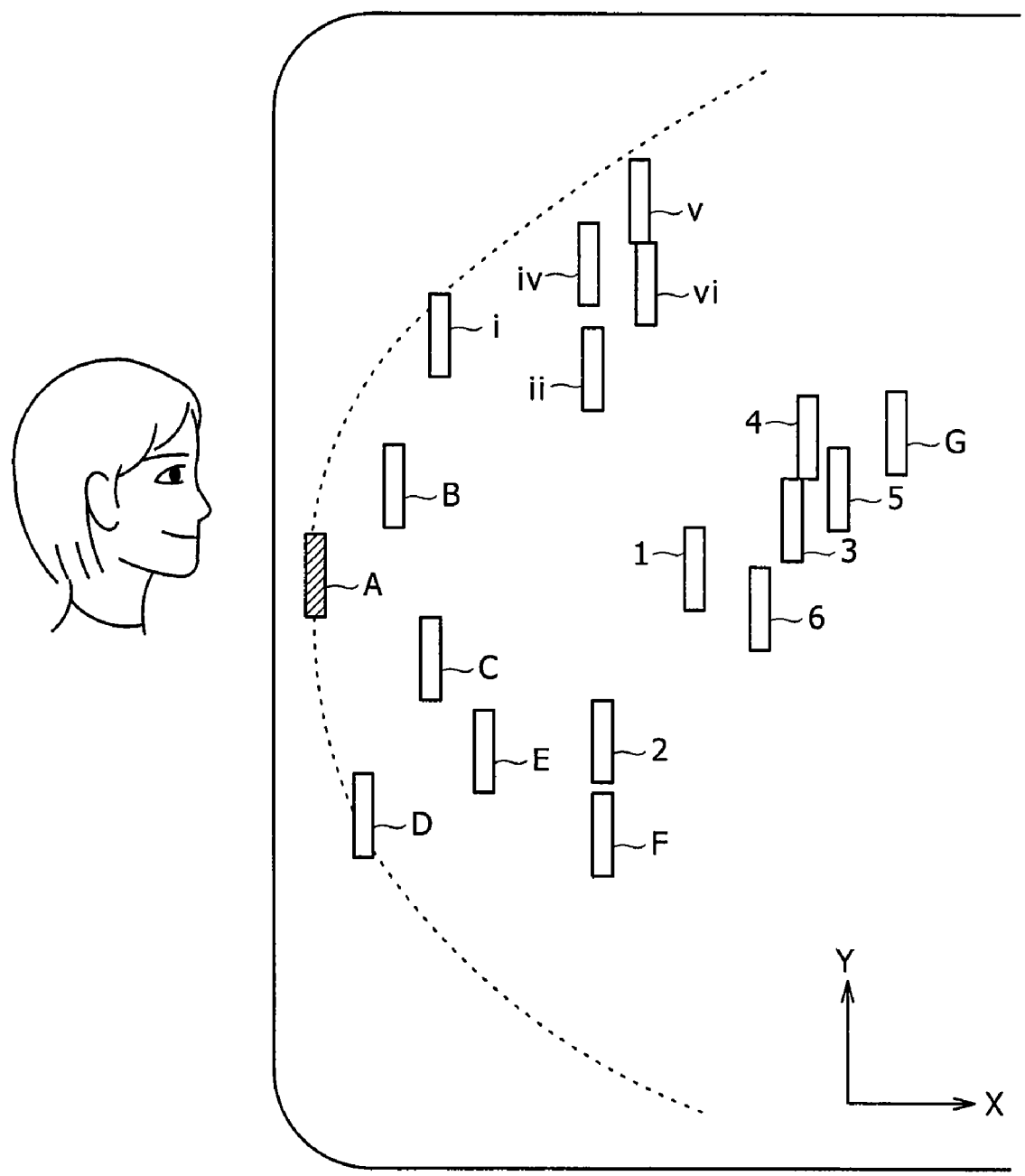
FIG. 15 is a schematic view explanatory of the typical screen in FIG. 14.

FIG. 15 is a schematic view showing how the thumbnails in FIG. 14 would look if viewed crosswise (along the X axis) for purpose of illustration. In FIG. 14, the thumbnails were shown laid out three-dimensionally in terms of their degrees of approximation.

In FIG. 15, the selected thumbnail A comes at the forefront. Behind the selected thumbnail A are the candidate thumbnails deployed in a hemispheric pattern in the depth direction (along the Y axis) as indicated by broken lines. The candidate thumbnails B, C, D, etc., having high degrees of approximation relative to the selected content A are located close to the selected thumbnail A; the candidate thumbnails G, "5," etc., having low degrees of approximation relative to the selected content A are positioned away (rightward) from the selected thumbnail A.

As described, when the selected thumbnail and candidate thumbnails are laid out three-dimensionally, numerous candidate thumbnails can be positioned in the depth direction (along the Y axis). This scheme is particularly effective where there exist a large number of candidate thumbnails to be displayed.

On the other hand, candidate thumbnails could be so numerous that they overlap with one another, some being hidden behind the others. In such a case, it is all the more advantageous to move the selected thumbnail inside the screen. That is, relocating the selected thumbnail changes the layout of the candidate thumbnails temporarily from their steady state and thereby reveals those been hidden. It then becomes appreciably easier for the user to take notice of the hitherto-concealed candidate thumbnails.

In the foregoing examples, the degrees of approximation were shown to be calculated between the selected content and each of the candidate contents involved. The candidate thumbnails were then laid out in accordance with the calculated degrees of approximation relative to the selected thumbnail. If a new candidate thumbnail was selected, the degrees of approximation were again calculated between the newly selected content and each of the candidate contents, and the selected thumbnail and candidate thumbnails were laid out anew accordingly. In other words, the candidate thumbnails were relocated solely in keeping with their degrees of approximation relative to the currently selected content, without regard to the chronological connection between the successively selected thumbnails.

In some cases, however, the content desired by the user may be reached more quickly if the user is presented with the contents having close connection with (i.e., high degrees of approximation to) a plurality of previously chronologically selected thumbnails by the user.

The above scheme may be implemented by calculating degrees of approximation between a virtually integral content, i.e., a content integrating a plurality of contents selected in the past on the one hand, and each of candidate contents on the other hand. The candidate thumbnails may then be laid out in accordance with the calculated degrees of approximation relative to the virtually integral thumbnail.

Illustratively, suppose that a virtually integral content is derived from five contents in the past including the currently selected content (each called a integral base content). In this case, as many as "m" feature quantities are assumed to be first calculated to make up an integral content. The feature quantity of the integral content may be calculated illustratively as a mean value of the feature quantities of the five integrated base contents. Alternatively, it may be assumed that the more recent the selection of the content, the greater the user's interest in that content. On that assumption, the most recently selected integral base content is assigned the most weighted feature quantity, with the other four less recently selected integrated base contents being assigned progressively less weighted feature quantities. These feature quantities weighted in this manner are then averaged to find a mean value.

Thereafter, the degrees of approximation between the integral content and each of the multiple candidate contents are calculated by use of the expression (1) shown above. Layouts of the candidate thumbnails around the selected thumbnail are determined in accordance with the calculated degrees of approximation.

Calculating the degrees of approximation relative to the integral content before the positioning of the candidate thumbnails on the display screen is illustratively equivalent to a typical content search function whereby a plurality of keywords are input and the contents including (i.e., associated with) the entered keywords are retrieved and presented.

In the above example, as expressed by the expression (1), the degrees of approximation between the selected content and each of a plurality of candidate contents were shown calculated using all "m" feature quantities specific to the contents. Alternatively, not all feature quantities need to be used in the calculations. For example, some of the "m" feature quantities may be selected according to a predetermined contention and the selected feature quantities alone may be used to calculate the degrees of approximation.

In another example, as expressed by the expression (3) shown below, the feature quantities involved may each be weighted so that certain feature quantities may be given more importance than others when subject to calculation. The expression (3) is given as $$DA(p, q) = SQRT\{w1(PA(p, 1) - PA(q, 1))2 + \qquad (3)$$
$$w2(PA(p, m) - PA(q, m))2 + \ldots +$$
$$wm(PA(p, m) - PA(q, m))2\}$$

where, ws stands for the weight of the feature quantity PA(k, s).

In the foregoing examples, the selected thumbnail A was shown positioned at the center of the screen. However, this is not limitative of the present invention. The candidate thumbnails may be laid out in patterns other than the circular (or spherical) pattern around the selected thumbnail.

Figure 16:
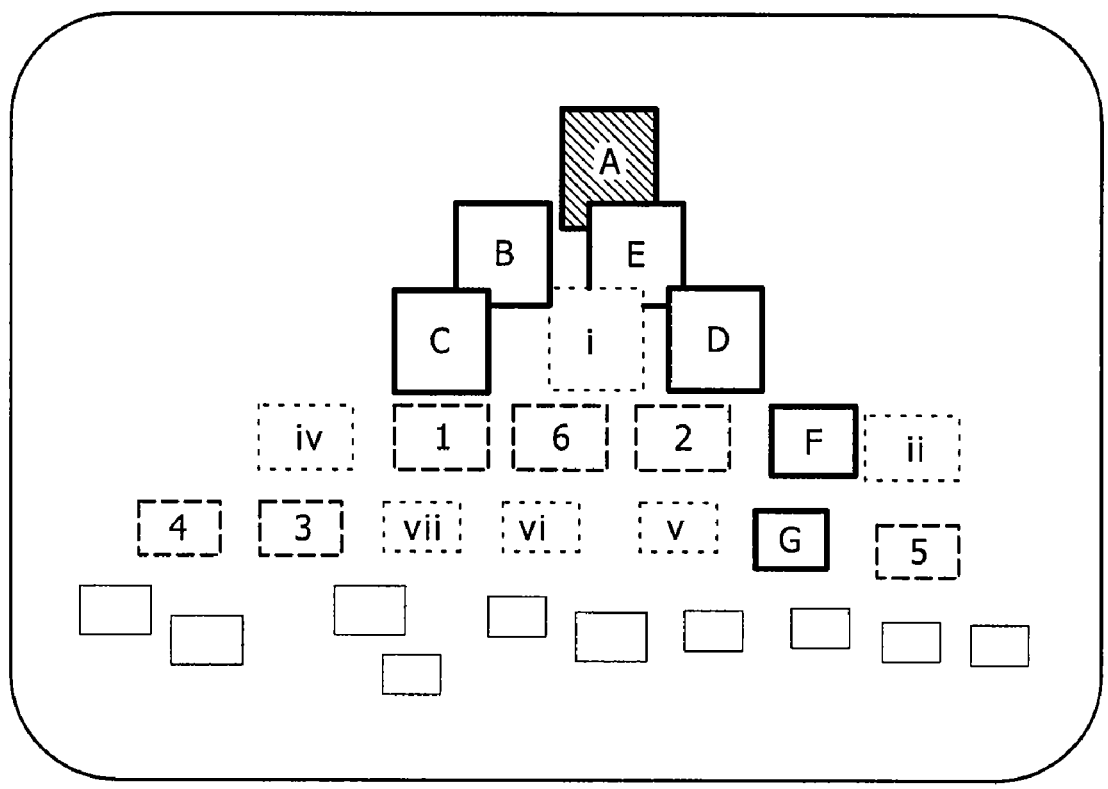
FIG. 16 is a schematic view showing another typical screen on which thumbnails are laid out in a two-dimensional space.

Illustratively, as shown in FIG. 16, the selected thumbnail A may be positioned at the top in the middle of the screen, with candidate thumbnails laid out in a pyramidal pattern under the selected thumbnail A. In this setup, the higher the degree of approximation of the candidate thumbnail under the selected candidate A, the closer that candidate thumbnail located to the selected thumbnail A.

Figure 17:
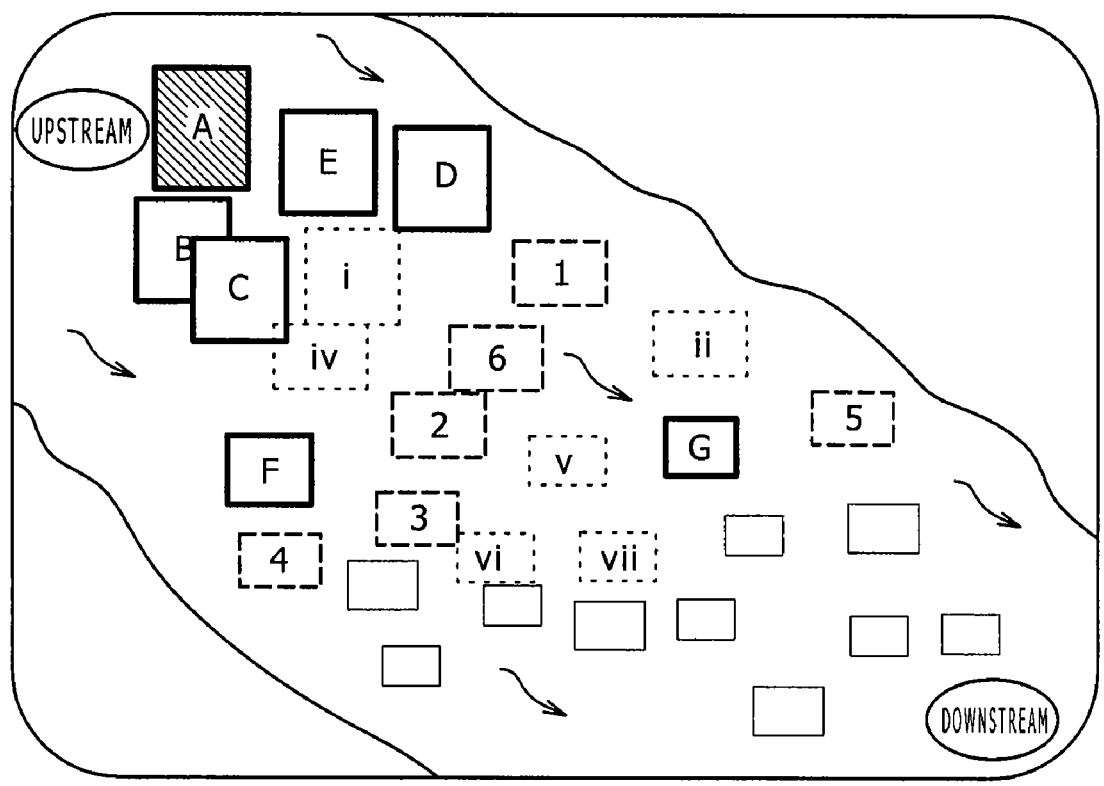
FIG. 17 is a schematic view showing yet another typical screen on which thumbnails are laid out in a two-dimensional space.

In yet another example, as shown in FIG. 17, the selected thumbnail may be positioned in the top left corner of the screen. From that thumbnail position, a river of candidate thumbnails is assumed to flow toward the bottom right corner of the screen. It is then assumed that a force "f" is exerted in the flowing direction of the river, the force "f" being in equilibrium with the attraction between the selected thumbnail A and each of the candidate thumbnails.

In the foregoing examples, the thumbnails representing all contents held by the content holding device 26 were shown to be displayed on the screen. Alternatively, the user may be prompted to select a category of contents to be first displayed (i.e., retrieved). Thumbnails belonging to the selected category may then be displayed. That is, thumbnails may be laid out on the screen on a category-by-category basis.

The invention is claimed as follows:

1. An information processing method which, when a user searches through a plurality of contents for a desired content, causes a display device to display a plurality of indexes corresponding to said plurality of contents, wherein said plurality of contents includes: (i) a first content which corresponds to a first index; (ii) a second content which corresponds to a second index; and (iii) a third content which corresponds to a third index, said information processing method comprising:
    selecting said first content;
    calculating:
        (i) a first degree of approximation between the selected first content and the second content, and
        (ii) a second degree of approximation between the selected first content and the third content; and
    determining:
        (i) a first layout of the first index of said selected first content,
        (ii) a second layout of the second index at a first distance from said first index of said selected first content in accordance with said first degree of approximation,
        (iii) a third layout of the third index at a second distance from said first index of said selected first content in accordance with said second degree of approximation, and
        (iv) a spring model including a plurality of springs, wherein each of the plurality of indexes displayed on the display device is connected to the first index by one of the plurality of springs, wherein the second index is connected to the first index by a first spring, and the third index is connected to the first index by a second spring, and wherein a first spring constant of the first spring is proportional to the first degree of approximation and a second spring constant of the second spring is proportional to the second degree of approximation;
    wherein said second index and said third index move according to the spring model in response to said user moving said first index, wherein said second index moves at a higher speed than said third index; and
    wherein: (i) said first index of said selected first content; (ii) said second index of said second content; and (iii) said third index of said third content are displayed on said display device in a manner laid out in said determining step.

2. A computer program product embodied in a computer readable medium storing a program for causing a computer to execute a procedure which, when a user searches through a plurality of contents for a desired content, causes a display device to display a plurality of indexes corresponding to said plurality of contents, wherein said plurality of contents includes: (i) a first content which corresponds to a first index; (ii) a second content which corresponds to a second index; and (iii) a third content which corresponds to a third index, said procedure comprising:
    selecting said first content;
    calculating:
        (i) a first degree of approximation between the selected first content and the second content, and
        (ii) a second degree of approximation between the selected first content and the third content; and
    determining:
        (i) a first layout of the first index of said selected first content,
        (ii) a second layout of the second index at a first distance from said first index of said selected first content in accordance with said first degree of approximation,
        (iii) a third layout of the third index at a second distance from said first index of said selected first content in accordance with said second degree of approximation, and
        (iv) a spring model including a plurality of springs, wherein each of the plurality of indexes displayed on the display device is connected to the first index by one of the plurality of springs, wherein the second index is connected to the first index by a first spring, and the third index is connected to the first index by a second spring, and wherein a first spring constant of the first spring is proportional to the first degree of approximation and a second spring constant of the second spring is proportional to the second degree of approximation;
    wherein said second index and said third index move according to the spring model in response. to said user moving said first index, wherein said second index moves at a higher speed than said third index; and
    wherein: (i) said first index of said selected first content; (ii) said second index of said second content; and (iii) said third index of said third content are displayed on said display device in a manner laid out in said determining step.

3. An information processing apparatus which, when a user searches through a plurality of contents for a desired content, causes a display device to display a plurality of indexes corresponding to said plurality of contents, wherein said plurality of contents includes: (i) a first content which corresponds to a first index; (ii) a second content which corresponds to a second index; and (iii) a third content which corresponds to a third index, said information processing apparatus comprising:
    a content selection device configured to select said first content;
    an approximation degree calculation device configured to calculate:
        (i) a first degree of approximation between the selected first content and the second content, and
        (ii) a second degree of approximation between the selected first content and the third content; and
    a layout determination device configured to determine:
        (i) a first layout of the first index of said selected first content,
        (ii) a second layout of the second index at a first distance from said first index of said selected first content in accordance with said first degree of approximation,
        (iii) a third layout of the third index at a second distance from said first index of said selected first content in accordance with said second degree of approximation, and
        (iv) a spring model including a plurality of springs, wherein each of the plurality of indexes displayed on the display device is connected to the first index by one of the plurality of springs, wherein the second index is connected to the first index by a first spring, and the third index is connected to the first index by a second spring, and wherein a first spring constant of the first spring is proportional to the first degree of approximation and a second spring constant of the second spring is proportional to the second degree of approximation;

wherein said second index and said third index move according to the spring model in response to said user moving said first index, wherein said second index moves at a higher speed than said third index; and wherein: (i) said first index of said selected first content; (ii) said second index of said second content; and (iii) said third index of said third content are displayed on said display device in a manner laid out by said layout determination device.

4. The information processing apparatus of claim 3, wherein said contents are pictures and said indexes are thumbnails of said pictures.

5. The information processing apparatus of claim 3, wherein said approximation degree calculation device calculates said degrees of approximation based on feature quantities of said contents.

6. The information processing apparatus of claim 3, wherein said layout determination device determines said second layout of said second index and said third layout of said third index in such a manner that: (i) said first distance between said selected first index and said second index; and (ii) said second distance between said selected first index and said third index will be inversely proportional to said first degree of approximation and said second degree of approximation.

7. The information processing apparatus of claim 3, wherein said layout determination device determines said layouts in a two-dimensional space.

8. The information processing apparatus of claim 3, wherein said layout determination device determines said layouts in a three-dimensional space.

9. The information processing apparatus of claim 3, further comprising:

an addition device configured to add auxiliary indications representing said first degree of approximation and said second degree of approximation to said second index and said third index.

10. The information processing apparatus of claim 3, wherein said second index of said second content moves at a speed proportional to said first spring constant associated with said second index of said second content in response to said user moving said first index.

11. The information processing apparatus of claim 3, wherein said second index of said second content and said third index of said third content vibrate according to the spring model before settling, in response to said user moving said first index.

12. The information processing apparatus of claim 3, wherein each of the plurality of springs has a same natural length.

13. The information processing apparatus of claim 3, wherein the layout determination device is configured to determine an overall layout of the plurality of indexes displayed on the display device in a manner avoiding overlaps of the plurality of indexes.

14. The information processing apparatus of claim 3, wherein the layout determination device is configured to determine an overall layout of the plurality of indexes displayed on the display device in a manner allowing overlaps of the plurality of indexes, and wherein the overall layout temporarily changes from a steady state determined by the spring model in response to said user relocating an overlapped index.

* * * * *